(12) United States Patent
Han

(10) Patent No.: US 12,449,942 B2
(45) Date of Patent: Oct. 21, 2025

(54) INPUT SENSOR AND ELECTRONIC DEVICE INCLUDING THE SAME

(71) Applicant: Samsung Display Co., Ltd., Yongin-si (KR)

(72) Inventor: Jeongyun Han, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/601,909

(22) Filed: Mar. 11, 2024

(65) Prior Publication Data
US 2024/0319833 A1   Sep. 26, 2024

(30) Foreign Application Priority Data

Mar. 21, 2023  (KR) .......................... 10-2023-0036978
Oct. 31, 2023  (KR) .......................... 10-2023-0148421

(51) Int. Cl.
*G06F 3/044*   (2006.01)
*G06F 3/041*   (2006.01)

(52) U.S. Cl.
CPC .......... *G06F 3/0446* (2019.05); *G06F 3/0412* (2013.01); *G06F 3/04164* (2019.05); *G06F 2203/04111* (2013.01); *G06F 2203/04112* (2013.01)

(58) Field of Classification Search
CPC .. G06F 3/0446; G06F 3/0412; G06F 3/04164; G06F 2203/04111; G06F 2203/04112
See application file for complete search history.

(56) References Cited

U.S. PATENT DOCUMENTS 4,233,602 A  *  11/1980  Hanmura ............. G09G 3/3622
                                                       345/55
4,805,994 A  *   2/1989  Miyajima ......... G02F 1/134336
                                                       345/87
8,153,016 B2 *   4/2012  Hotelling ............. G06F 3/0443
                                                       216/13
(Continued)

FOREIGN PATENT DOCUMENTS

KR   10-2016-0043583 A    4/2016
KR   10-2018-0079025 A    7/2018
(Continued)

*Primary Examiner* — Benyam Ketema
(74) *Attorney, Agent, or Firm* — Womble Bond Dickinson (US) LLP

(57) ABSTRACT

An input sensor includes: a first electrode extending along a first direction and transmitting a first signal; a second electrode transmitting a second signal different from the first signal, and including a plurality of first sensor patterns arranged along a second direction intersecting the first direction and a first intersecting wire and connecting the first sensor patterns to each other; a third electrode transmitting a third signal different from the first signal, and including a plurality of second sensor patterns alternately arranged with the first sensor patterns along the second direction and a second intersecting wire and connecting the second sensor patterns to each other; and a sensor driving circuit including an output part configured to output a signal obtained by subtracting the third signal from the second signal.

24 Claims, 20 Drawing Sheets

(56) References Cited

U.S. PATENT DOCUMENTS

| | | | |
|---|---|---|---|
| 8,754,662 B1* | 6/2014 | Weng | G06F 3/0443 345/173 |
| 10,541,281 B2 | 1/2020 | Han et al. | |
| 10,627,967 B2* | 4/2020 | Kim | G06F 3/0446 |
| 2009/0314621 A1* | 12/2009 | Hotelling | G06F 3/0443 200/600 |
| 2010/0149116 A1* | 6/2010 | Yang | G06F 3/0446 349/110 |
| 2010/0309162 A1* | 12/2010 | Nakanishi | G09G 3/3696 345/174 |
| 2011/0048812 A1* | 3/2011 | Yilmaz | G06F 3/04164 178/18.06 |
| 2011/0279169 A1* | 11/2011 | Salaverry | G01R 27/2605 200/600 |
| 2011/0279409 A1* | 11/2011 | Salaverry | G06F 3/0448 345/174 |
| 2013/0063371 A1* | 3/2013 | Lee | G06F 3/0412 345/173 |
| 2013/0181943 A1* | 7/2013 | Bulea | G06F 3/041 345/174 |
| 2013/0341651 A1* | 12/2013 | Kim | G06F 3/0445 257/432 |
| 2014/0049503 A1* | 2/2014 | Cok | G06F 3/0445 345/174 |
| 2014/0139761 A1* | 5/2014 | Yanagawa | G06F 3/0448 349/12 |
| 2014/0182894 A1* | 7/2014 | Liu | G06F 3/04164 174/251 |
| 2014/0198268 A1* | 7/2014 | Sugita | G06F 3/0412 349/12 |
| 2014/0267137 A1* | 9/2014 | Solven | G06F 3/0443 345/174 |
| 2014/0346027 A1* | 11/2014 | Li | G06F 3/0443 200/600 |
| 2015/0060255 A1* | 3/2015 | Chen | H03K 17/9622 200/5 R |
| 2015/0109548 A1* | 4/2015 | Kim | G06F 3/0412 349/12 |
| 2015/0261370 A1* | 9/2015 | Yoo | G06F 3/0412 345/173 |
| 2016/0103516 A1* | 4/2016 | An | G06F 3/0443 345/174 |
| 2016/0299611 A1* | 10/2016 | Park | H10K 59/40 |
| 2017/0090622 A1* | 3/2017 | Badaye | G06F 3/0448 |
| 2017/0168635 A1* | 6/2017 | Xiang | G06F 3/0446 |
| 2020/0125202 A1* | 4/2020 | Li | H10K 59/40 |
| 2020/0363893 A1 | 11/2020 | Kim et al. | |
| 2021/0005677 A1* | 1/2021 | Lee | G06F 3/04166 |
| 2021/0247886 A1* | 8/2021 | Lee | G06F 3/0412 |
| 2021/0373711 A1* | 12/2021 | Smith | G06F 3/04164 |
| 2022/0155906 A1* | 5/2022 | Paik | G06F 3/04166 |
| 2022/0206638 A1* | 6/2022 | Kim | G06F 3/0448 |
| 2022/0291782 A1 | 9/2022 | Hyun et al. | |
| 2023/0004272 A1* | 1/2023 | Oh | G06F 3/04166 |
| 2023/0229256 A1* | 7/2023 | Oh | G06F 3/04166 345/174 |
| 2024/0231532 A1 | 7/2024 | Kim et al. | |
| 2024/0310948 A1* | 9/2024 | Bok | G06F 3/04164 |

FOREIGN PATENT DOCUMENTS

| | | |
|---|---|---|
| KR | 10-2022-0129153 A | 9/2022 |
| KR | 10-2499519 B1 | 2/2023 |
| WO | 2022/169185 A2 | 8/2022 |

* cited by examiner

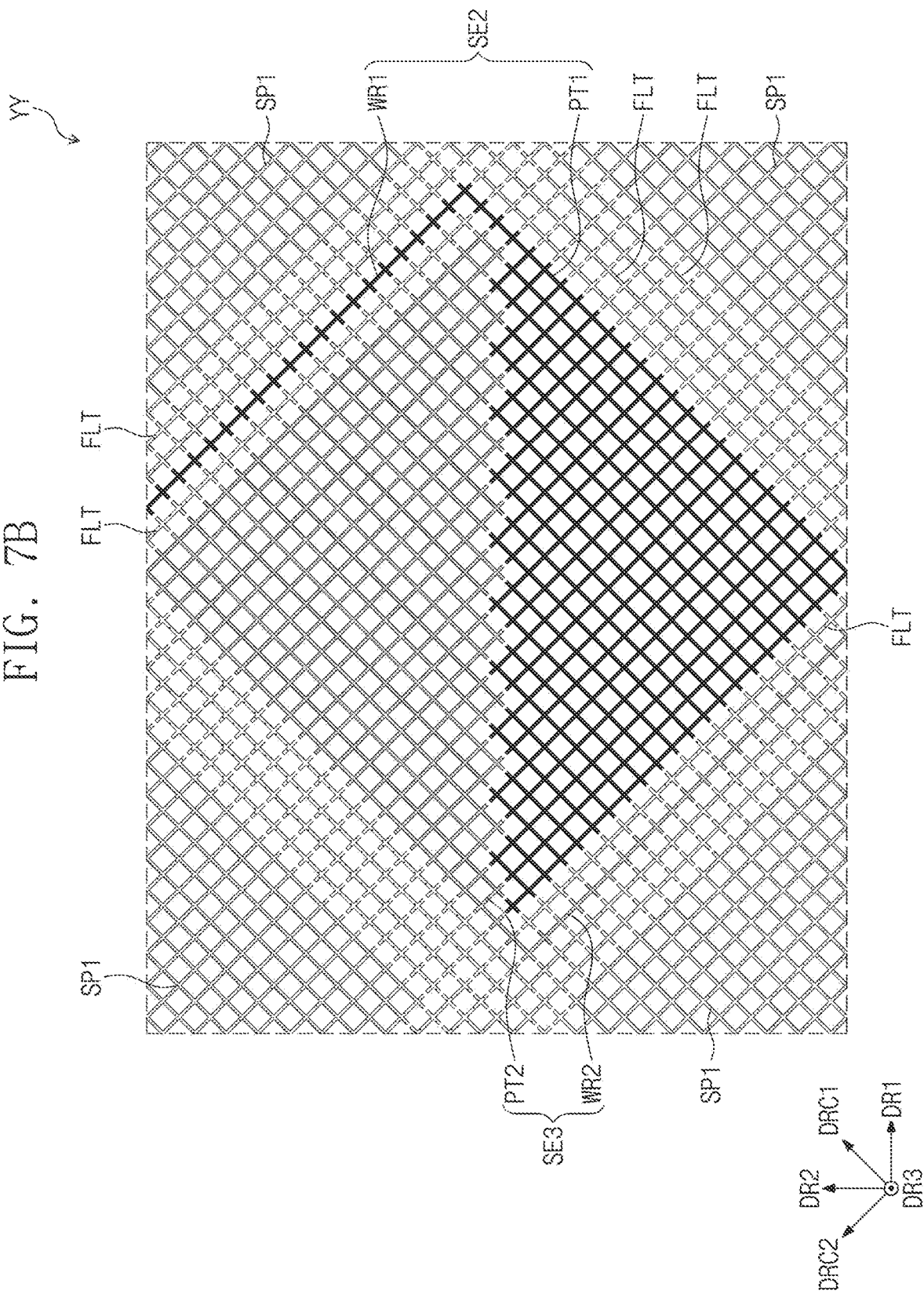

INPUT SENSOR AND ELECTRONIC DEVICE INCLUDING THE SAME

CROSS-REFERENCE TO RELATED APPLICATIONS

The present application claims priority to and the benefit of Korean Patent Application No. 10-2023-0036978, filed on Mar. 21, 2023, and Korean Patent Application No. 10-2023-0148421, filed on Oct. 31, 2023, in the Korean Intellectual Property Office, the entire disclosures of each of which are incorporated herein by reference.

BACKGROUND

1. Field

Aspects of an embodiment of the present disclosure described herein relate to an input sensor and an electronic device including the same.

2. Description of the Related Art

Multimedia electronic devices such as a television, a mobile phone, a tablet computer, a navigation device, a game machine, and the like have a display device for displaying an image. In addition, the display device is also provided inside a vehicle.

The display device may include an input sensor capable of providing a touch-based input scheme that allows a user to easily, intuitively, and conveniently input information or a command in addition to conventional input schemes such as a button, a keyboard, a mouse, and the like.

The above information disclosed in this Background section is only for enhancement of understanding of the background and therefore the information discussed in this Background section does not necessarily constitute prior art.

SUMMARY

Aspects of an embodiment of the present disclosure described herein relate to an input sensor and an electronic device including the same, and for example, to an input sensor with relatively improved sensitivity and an electronic device including the same.

Aspects of an embodiment of the present disclosure include an input sensor in which deterioration in sensitivity is prevented or reduced and an electronic device including the same.

According to an embodiment, an input sensor includes a first electrode extending along a first direction and transmitting a first signal, a second electrode transmitting a second signal different from the first signal, and including a plurality of first sensor patterns arranged along a second direction intersecting the first direction and a first intersecting wire for connecting the first sensor patterns to each other, a third electrode transmitting a third signal different from the first signal, and including a plurality of second sensor patterns alternately arranged with the first sensor patterns along the second direction and a second intersecting wire for connecting the second sensor patterns to each other, and a sensor driving circuit including an output part outputting a signal obtained by subtracting the third signal from the second signal, and the first intersecting wire and the second intersecting wire are on the same layer as the first sensor patterns and the second sensor patterns.

According to an embodiment, each of the first sensor patterns and the second sensor patterns may include a plurality of mesh lines intersecting each other.

According to an embodiment, the first intersecting wire may have an integral shape with the first sensor patterns.

According to an embodiment, the second intersecting wire may have an integral shape with the first sensor patterns.

According to an embodiment, the third electrode may further include a bridge on a different layer from the second sensor patterns, and the second intersecting wire may be connected to the second sensor patterns via the bridge.

According to an embodiment, the second electrode may further include a bridge on a different layer from the first sensor patterns, and the first intersecting wire may be connected to the first sensor patterns via the bridge.

According to an embodiment, the bridge may overlap one of the second sensor patterns on a plane.

According to an embodiment, the first electrode may include a plurality of first sensor portions arranged along the first direction, and a plurality of first connection portions, wherein each first connection portion is between each adjacent two of the first sensor portions to connect the two to each other, and the first connection portions may be arranged on the same layer as the bridge.

According to an embodiment, the first intersecting wire and the second intersecting wire may be arranged to be spaced apart from the first electrode in the first direction.

According to an embodiment, the first intersecting wire may be spaced apart from the second sensor patterns in the first direction.

According to an embodiment, the second intersecting wire may be spaced apart from the first electrode in the first direction.

According to an embodiment, the first intersecting wire and the second intersecting wire may not overlap each other when viewed in the first direction.

According to an embodiment, the first intersecting wire may include a first sub-wire and a second sub-wire spaced apart from each other in the first direction with the second sensor patterns interposed between, and each of the first sub-wire and the second sub-wire may be between the second sensor patterns and the first electrode.

According to an embodiment, the second intersecting wire may include a third sub-wire and a fourth sub-wire spaced apart from each other in the first direction with the first sensor patterns interposed between, and the third sub-wire may intersect the first sub-wire on a plane, and the fourth sub-wire may intersect the second sub-wire on the plane.

According to an embodiment, the input sensor may further include a plurality of bridges on a different layer from the first intersecting wire and the second intersecting wire, and the bridges may be connected to the first sub-wire and the second sub-wire, respectively, or connected to the third sub-wire and the fourth sub-wire, respectively.

According to an embodiment, the input sensor may further include a floating pattern electrically insulated from the first to third electrodes, and the floating pattern may be on the same layer as the first sensor patterns and the second sensor patterns.

According to an embodiment, the floating pattern may be between the first intersecting wire and the second sensor patterns or between the second intersecting wire and the first sensor patterns.

According to an embodiment, an electronic device includes a plurality of pixels, an encapsulation layer on the pixels, and an input sensor on the encapsulation layer, the input sensor includes a first electrode extending along a first direction and transmitting a first signal, a second electrode transmitting a second signal different from the first signal, and including a plurality of first sensor patterns arranged along a second direction intersecting the first direction and a first intersecting wire for connecting the first sensor patterns to each other, a third electrode transmitting a third signal different from the first signal, and including a plurality of second sensor patterns alternately arranged with the first sensor patterns along the second direction and a second intersecting wire for connecting the second sensor patterns to each other, and a sensor driving circuit including an output part outputting a signal obtained by subtracting the third signal from the second signal, and the first intersecting wire and the second intersecting wire are on the same layer as the first sensor patterns and the second sensor patterns.

According to an embodiment, the first intersecting wire may be on one side of the second sensor patterns, and the second intersecting wire may be on the other side of the first sensor patterns.

According to an embodiment, the first intersecting wire may include a first wire and a second wire spaced apart from each other with the second sensor patterns between in the first direction.

According to an embodiment, the first wire and the second wire may have an integral shape with the first sensor patterns.

According to an embodiment, the second electrode may further include a bridge on a different layer from the first wire, and the bridge may connect the first wire and the first sensor patterns to each other.

According to an embodiment, the second intersecting wire may overlap the bridge on a plane.

According to an embodiment, the first sensor pattern may form a single sensor portion.

According to an embodiment, the first sensor pattern may include a plurality of first sensor patterns arranged along the first direction, and the plurality of first sensor patterns may be connected to each other to form a single sensor portion.

According to an embodiment, the first electrode may include the sensor portion including a plurality of patterns between the first sensor patterns and connected to each other.

According to an embodiment, the input sensor may generate a difference value between the signal transmitted via the second electrode and the signal transmitted via the third electrode.

BRIEF DESCRIPTION OF FIGURES

The above and other aspects and features of an embodiment of the present disclosure will become more apparent by describing in more detail aspects of an embodiment thereof with reference to the accompanying drawings.

FIG. 7B is an enlarged view showing a partial area of FIG. 7A.

DETAILED DESCRIPTION

Figure 1A:
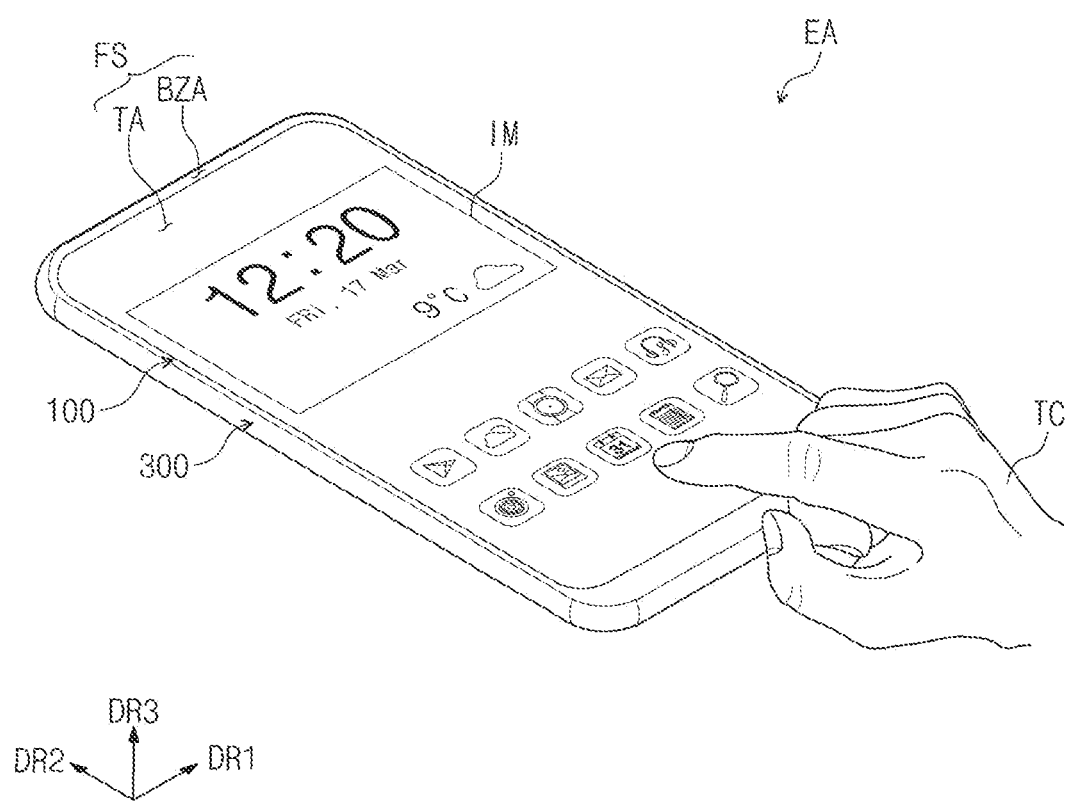
FIG. 1A is an assembled perspective view of an electronic device according to an embodiment of the present disclosure.

In the present document, when a component (or a region, a layer, a portion, and the like) is referred to as being "on", "connected to", or "coupled to" another component, it means that the component may be directly located/connected/coupled on another component or a third component may be located between the component and another component.

Like reference numerals refer to like components. In addition, in the drawings, thicknesses, ratios, and dimensions of components are exaggerated for effective description of technical content.

"and/or" includes all of one or more combinations that the associated components may define.

Terms such as first, second, and the like may be used to describe various components, but the components should not be limited by the terms. The above terms are used only for the purpose of distinguishing one component from another. For example, without departing from the spirit and scope of embodiments according to the present disclosure, a first component may be named as a second component, and similarly, the second component may also be named as the first component. The singular expression includes the plural expression unless the context clearly dictates otherwise.

In addition, terms such as "beneath", "below", "on", "above" are used to describe the relationship of the components shown in the drawings. The above terms are relative concepts, and are described with reference to directions indicated in the drawings.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should be understood that terms such as "include" or "have" are intended to specify that a feature, a number, a step, an operation, a component, a part, or a combination thereof described in the specification is present, and do not preclude a possibility of addition or existence of one or more other features or numbers, steps, operations, components, parts, or combinations thereof.

Hereinafter, aspects of an embodiment of the present disclosure will be described in more detail with reference to drawings.

Figure 1B:
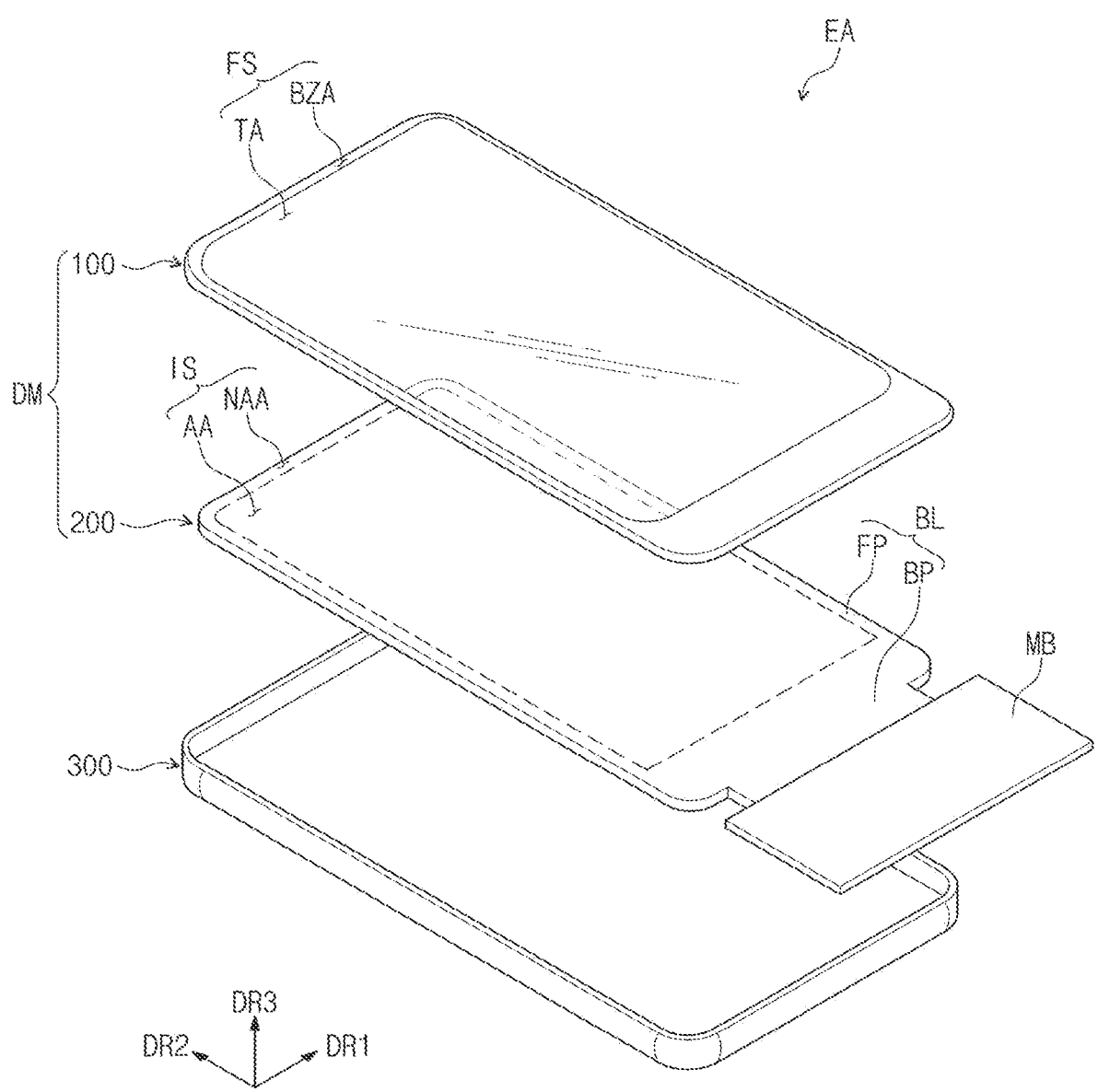
FIGS. 1B and 1C are exploded perspective views of a display device according to an embodiment of the present disclosure.
Figure 1C:
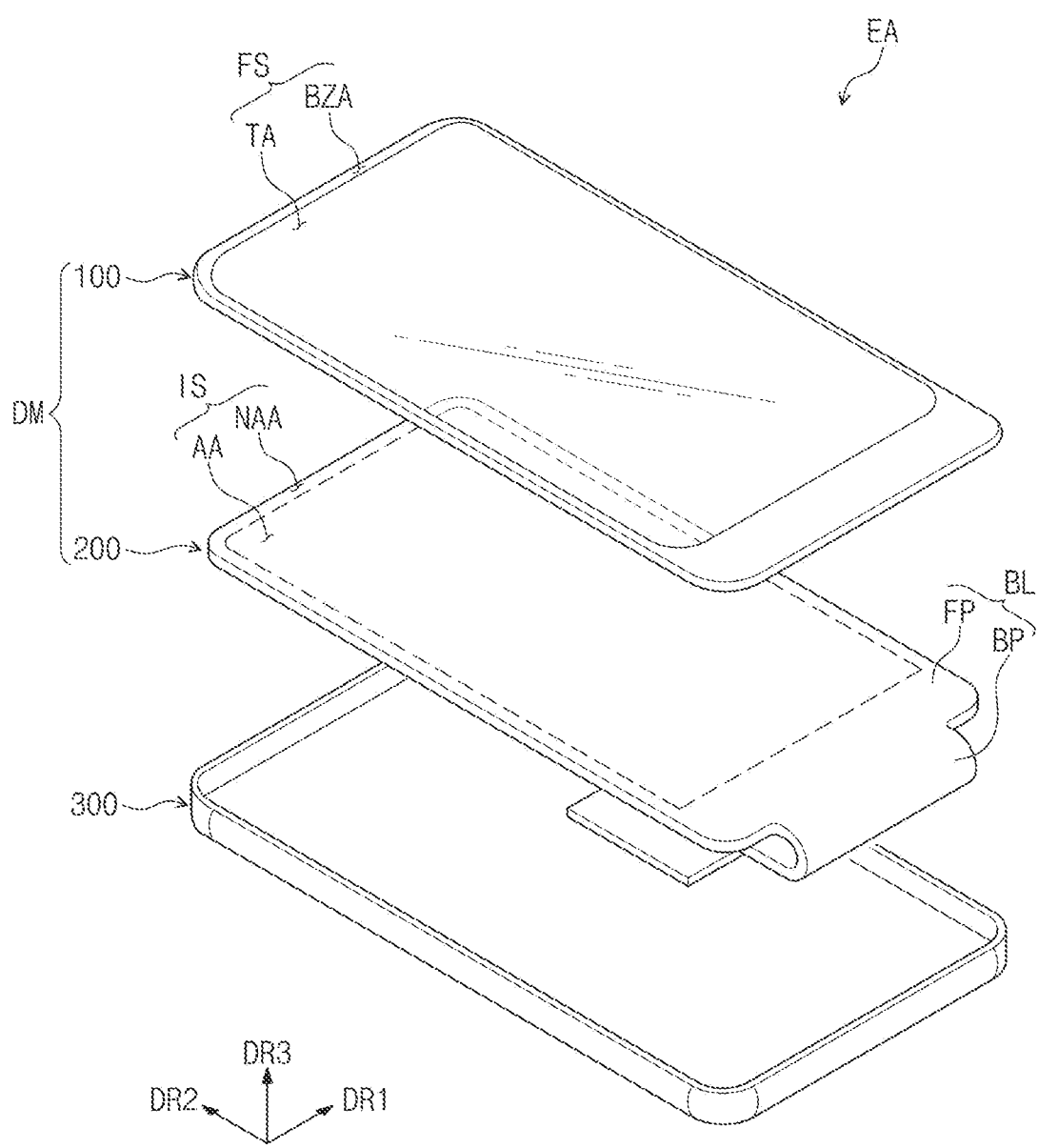

FIG. 1A is an assembled perspective view of an electronic device according to an embodiment of the present disclosure. FIGS. 1B and 1C are exploded perspective views of a display device according to an embodiment of the present disclosure. FIG. 1B shows a perspective view of a foldable electronic device according to an embodiment. FIG. 1B shows a perspective view in a state in which a component is unfolded, and FIG. 1C shows a perspective view in a state in which the corresponding component is folded. Hereinafter, aspects of an embodiment of the present disclosure will be described with reference to FIGS. 1A to 1C.

An electronic device EA may be a device that is activated in response to an electrical signal. The electronic device EA may display an image IM and sense an external input TC. The electronic device EA may include various embodiments. For example, the electronic device EA may include a tablet PC, a laptop computer, a computer, a smart television, and the like. In the present embodiments, the electronic device EA is illustrated as a smart phone as an example, but embodiments according to the present disclosure are not limited thereto.

The electronic device EA may display the image IM in a third direction DR3 on a display surface FS parallel to each of a first direction DR1 and a second direction DR2. The image IM may include static images as well as dynamic images (e.g., video images). FIG. 1A shows a clock and a plurality of icons as an example of the image IM. The display surface FS on which the image IM is displayed may correspond to a front surface of the electronic device EA and may correspond to the front surface FS of a window 100. Hereinafter, the display surface and the front surface of the electronic device EA and the front surface FS of the window 100 will use the same reference numeral.

In the present embodiments, a front surface (or a top surface) and a rear surface (or a bottom surface) of each member are defined based on the direction in which the image IM is displayed. The front surface and the rear surface may be opposite to each other in the third direction DR3, and a normal direction of each of the front surface and the rear surface may be parallel to the third direction DR3. A separation distance between the front surface and the rear surface in the third direction DR3 may correspond to a thickness of a display panel DP in the third direction DR3. In one example, directions indicated by the first to third directions DR1, DR2, and DR3 are relative concepts and are able to be converted into other directions. Hereinafter, first to third directions are directions respectively indicated by the first to third directions DR1, DR2, and DR3 and refer to the same reference numerals.

Alternatively, for example, the electronic device EA according to an embodiment of the present disclosure may sense the input TC of a user applied from the outside. The user's input TC includes various types of external inputs such as a body part of the user, light, heat, or a pressure. In the present embodiments, the user's input TC is shown as a user's hand applied to the front surface. However, this is shown as an example. As described above, the user's input TC may be provided in the various types, and the electronic device EA may sense the user's input TC applied to a side surface or a rear surface of the electronic device EA based on a structure of the electronic device EA, and the present disclosure may not be limited to any one embodiment.

As shown in FIGS. 1B and 1C, the electronic device EA may include a display module DM and an external casing 300. The display module DM may include the window 100 and an electronic panel 200. In one example, although FIG. 1A shows the electronic device EA in a rigid state, the electronic device EA may be a foldable device that may be folded with reference to a folding axis without being limited thereto. The folding axis may be defined to be parallel to the first direction DR1, to be parallel to the second direction DR2, or to be other directions.

According to an embodiment, the external casing 300, the electronic panel 200, and the window 100 may be sequentially stacked along the third direction DR3. The window 100 and the external casing 300 are coupled to each other to form an outer appearance of the electronic device EA.

The window 100 is located on the electronic panel 200 and covers a front surface IS of the electronic panel 200. The window 100 may include an insulating panel. For example, the window 100 may be made of glass, plastic, or a combination thereof.

As described above, the front surface FS of the window 100 defines the front surface of the electronic device EA. A transmissive area TA may be an optically transparent area. For example, the transmissive area TA may be an area having a visible transmittance equal to or greater than about 90%.

A bezel area BZA may be an area having relatively low light transmittance compared to the transmissive area TA. The bezel area BZA defines a shape of the transmissive area TA. The bezel area BZA may be adjacent to the transmissive area TA and may surround the transmissive area TA.

The bezel area BZA may have a color (e.g., a set or predetermined color). The bezel area BZA may cover a peripheral area NAA of the electronic panel 200 to prevent or reduce visibility of the peripheral area NAA from the outside. This is shown as an example. In the window 100 according to an embodiment of the present disclosure, the bezel area BZA may be omitted.

The electronic panel 200 may display the image IM and sense the external input TC. The image IM may be displayed on the front surface IS of the electronic panel 200. The front surface IS of the electronic panel 200 includes an active area AA and the peripheral area NAA. The active area AA may be an area activated in response to an electrical signal.

According to an embodiment, the active area AA may be an area where the image IM is displayed, and at the same time, an area where the external input TC is sensed. The transmissive area TA at least overlaps the active area AA. For example, the transmissive area TA overlaps a front surface or at least a portion of the active area AA. Accordingly, the user may view the image IM or provide the external input TC via the transmissive area TA. However, this is shown as an example. The area where the image IM is displayed and the area where the external input TC is sensed may be separated from each other within the active area AA, and the present disclosure may not be limited to any one embodiment.

The peripheral area NAA may be the area covered by the bezel area BZA. The peripheral area NAA is adjacent to (e.g., in a periphery or outside a footprint of) the active area AA. The peripheral area NAA may surround the active area AA. A driving circuit, a driving wire, or the like for driving the active area AA may be located in the peripheral area NAA.

The electronic panel 200 may include a display portion and a sensor portion. The image IM may be substantially displayed on the display portion, and the external input TC may be substantially sensed on the sensor portion. The electronic panel 200 includes both the display portion and the sensor portion, thereby displaying the image IM and sensing the external input TC at the same time. A detailed description thereof will be described later.

At least a portion of the electronic panel 200 may be bent. A base layer BL constituting the electronic panel 200 may include a flat portion FP and a bendable portion BP. The base layer BL may be a component on which pixels displaying the image IM or sensors sensing the external input TC are located. A shape of the electronic panel 200 on a plane may substantially correspond to a shape of the base layer BL on a plane. The flat portion FP and the bendable portion BP may be connected to each other and formed in an integral shape. The active area AA may be provided to the flat portion FP. A circuit board MB may be spaced apart from the flat portion FP and coupled to the bendable portion BP.

The bendable portion BP may be bent from the flat portion FP. On a plane defined by the first direction DR1 and the second direction DR2, the bendable portion BP may provide the same plane as the flat portion FP as in FIG. 1B or may be bent to provide a plane different from the flat portion FP as in FIG. 1C. As the bendable portion BP is bent, the circuit board MB may be located on a rear surface of the electronic panel 200. According to an embodiment, the bendable portion BP to which the circuit board MB is connected in the electronic panel 200 is bent toward the rear surface of the electronic panel 200, so that the circuit board MB overlaps the electronic panel 200 when viewed from a plane. Accordingly, the circuit board MB may be easily accommodated in an accommodating space provided by the external casing 300, and an area size of the bezel area BZA may be reduced, thereby providing the electronic device EA with a narrow bezel.

In one example, the electronic device EA may further include the circuit board MB connected to the electronic panel 200. The circuit board MB is coupled to one side of the electronic panel 200 and is physically and electrically connected to the electronic panel 200. The circuit board MB may generate an electrical signal provided to the electronic panel 200, or receive a signal generated by the electronic panel 200 and operate the same as a result value including information on a sensed location or a strength of the external input TC.

The external casing 300 is coupled to the window 100 to define the outer appearance of the electronic device EA. The external casing 300 provides an internal space (e.g., a set or predetermined internal space). The electronic panel 200 may be accommodated in the internal space.

The external casing 300 may contain a material with relatively high rigidity. For example, the external casing 300 may include a plurality of frames and/or plates made of glass, plastic, or metal, or a combination thereof. The external casing 300 may stably protect components of the electronic device EA accommodated in the internal space from an external impact.

FIGS. 2A to 2F are cross-sectional views of a display module according to an embodiment of the present disclosure. FIGS. 2A to 2F show cross-sections defined by the first direction DR1 and the third direction DR3. In FIGS. 2A to 2F, the electronic panel 200 and the window 100 are shown together, and are shown simply to illustrate a stacking relationship of functional panels and/or functional units constituting the electronic panel 200.

The display module DM according to an embodiment of the present disclosure may include the display panel, an input sensing unit, an anti-reflection unit, and a window unit. At least some of the display panel, the input sensing unit, the anti-reflection unit, and the window unit may be formed by a continuous process or may be coupled to each other via an adhesive member. FIGS. 2A to 2F show a pressure sensitive adhesive film (PSA) as an example of the adhesive member. The adhesive member to be described below may include a conventional adhesive or glue and may not be particularly limited. According to an embodiment of the present disclosure, the anti-reflection unit and an optical control unit may be replaced with other components or may be omitted.

In FIGS. 2A to 2F, a component among the input sensing unit, the anti-reflection unit, the optical control unit, and the window unit formed via a continuous process with another component is expressed as a "layer". A component among the input sensing unit, the anti-reflection unit, the optical control unit, and the window unit coupled to another component via the adhesive member is expressed as a "panel". The panel may include a base layer providing a base surface, such as a synthetic resin film, a composite material film, a glass substrate, or the like, but the "layer" may omit the base layer. In other words, the units expressed as the "layers" are located on the base surface provided by another unit.

The input sensing unit, the anti-reflection unit, and the window unit may be referred to as an input sensing panel ISP, an anti-reflection panel RPP, and a window panel WP, or as the input sensing layer ISL, an anti-reflection layer RPL, and a window layer WL, respectively, depending on whether the base layer exists.

Figure 2A:
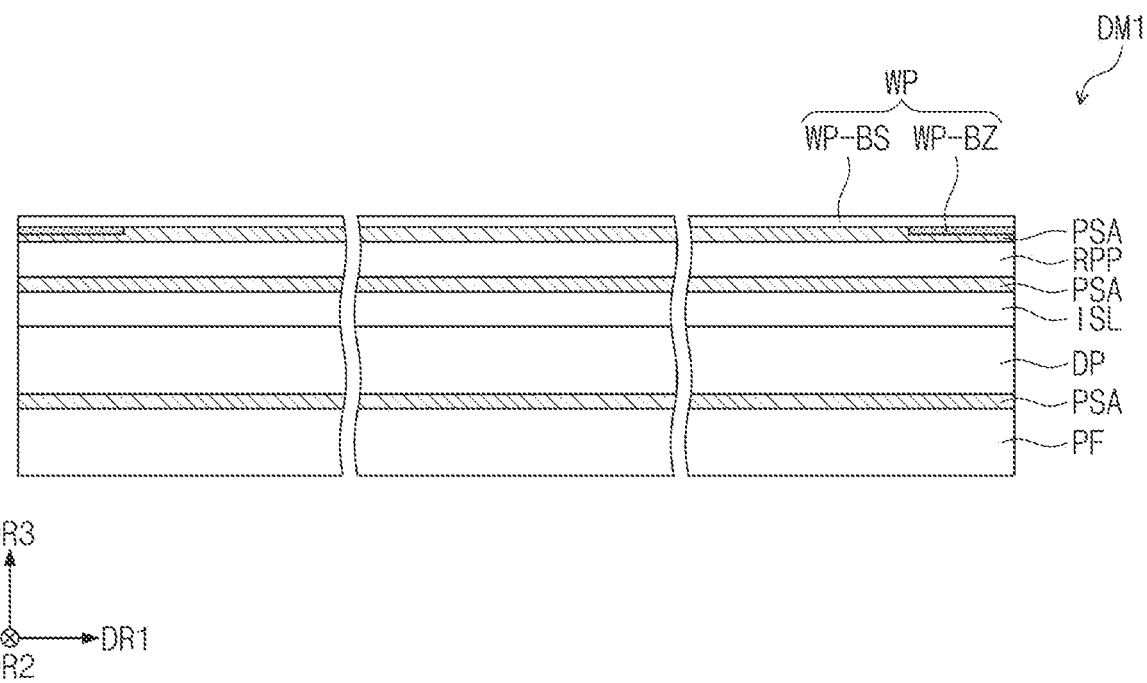
FIGS. 2A to 2F are cross-sectional views of a display module according to an embodiment of the present disclosure.

As shown in FIG. 2A, the display module DM may include the electronic panel 200, the anti-reflection panel RPP, the window panel WP, and a protective member PF. The electronic panel 200 may include the display panel DP and the input sensing layer ISL. The input sensing layer ISL is directly located on the display panel DP. Herein, "a component B1 is directly located on a component A1" means that a separate adhesive member is not located between the component A1 and the component B1. The component B1 is formed via a continuous process on a base surface provided by the component A1 after the component A1 is formed.

The pressure sensitive adhesive film (PSA) is located between the input sensing layer ISL and the anti-reflection panel RPP, between the anti-reflection panel RPP and the window panel WP, and between the display panel DP and the protective member PF.

The display panel DP displays the image IM (see FIG. 1), and the input sensing layer ISL acquires coordinate information of the external input. The protective member PF supports the display panel DP and protects the display panel DP from the external impact.

The protective member PF may include a plastic film as a base layer. The protective member PF may include the plastic film containing a thermoplastic resin, for example, at least one selected from a group consisting of polyethylene terephthalate (PET), polyethylene (PE), polyvinylchloride (PVC), polypropylene (PP), polystyrene (PS), polyacrylonitrile (PAN), a styrene-acrylonitrile copolymer (SAN), acrylonitrile-butadiene-styrene (ABS), polymethyl methacrylate (PMMA), and combinations thereof. In particular, polyethylene terephthalate (PET) has very excellent heat resistance and excellent fatigue strength, excellent electrical properties, and the like, and is less affected by temperature and humidity.

A material constituting the protective member PF may not be limited to the plastic resins and may include an organic/inorganic composite material. The protective member PF may include a porous organic layer and an inorganic material filled in pores of the organic layer.

The display panel DP according to an embodiment of the present disclosure may be a light-emitting display panel, but the present disclosure may not be particularly limited. For example, the display panel DP may be an organic light-emitting display panel or a quantum dot light-emitting display panel. A light-emitting layer of the organic light-emitting display panel may contain an organic light-emitting material. A light-emitting layer of the quantum dot light-emitting display panel may contain quantum dots, quantum rods, and the like. Hereinafter, the display panel DP is described as the organic light-emitting display panel.

The anti-reflection panel RPP reduces reflectance of natural light (or sunlight) incident from above the window panel WP. The anti-reflection panel RPP according to an embodiment of the present disclosure may contain a phase retarder and a polarizer. The phase retarder may be of a film type or a liquid crystal coating type, and may include a λ/2 phase retarder and/or a λ/4 phase retarder. The polarizer may also be of the film type or the liquid crystal coating type. The film type may include a stretchable synthetic resin film, and the liquid crystal coating type may include liquid crystals arranged in an arrangement (e.g., a set or predetermined arrangement). The phase retarder and the polarizer may further include a protective film. The phase retarder and the polarizer itself or the protective film thereof may be defined as a base layer of the anti-reflection panel RPP.

The anti-reflection panel RPP according to an embodiment of the present disclosure may include color filters. The color filters have an arrangement (e.g., a set or predetermined arrangement). The arrangement of the color filters may be determined in consideration of colors of light emitted from the pixels included in the display panel DP. The anti-reflection panel RPP may further include a black matrix adjacent to the color filters.

The window panel WP according to an embodiment of the present disclosure includes a base layer WP-BS and a light blocking pattern WP-BZ. The base layer WP-BS may include a glass substrate and/or a synthetic resin film. The base layer WP-BS is not limited to be a single layer. The base layer WP-BS may include two or more films bonded together by the adhesive member.

The light blocking pattern WP-BZ partially overlaps the base layer WP-BS. The light blocking pattern WP-BZ may be located on a rear surface of the base layer WP-BS to define the bezel area, that is, the peripheral area NAA (see FIG. 1) of the electronic device EA.

The light blocking pattern WP-BZ may be a colored organic film and may be formed using a coating scheme. However, this is an example, and the method for forming the light blocking pattern WP-BZ is not limited to any one embodiment. According to an embodiment, the window panel WP may further include a functional coating layer located on a front surface of the base layer WP-BS. The functional coating layer may include an anti-fingerprint layer, an anti-reflection layer, a hard coating layer, and the like.

In FIGS. 2B to 2F, the window panel WP and the window layer WL are briefly shown without distinction between the base layer WP-BS and the light blocking pattern WP-BZ.

Figure 2B:
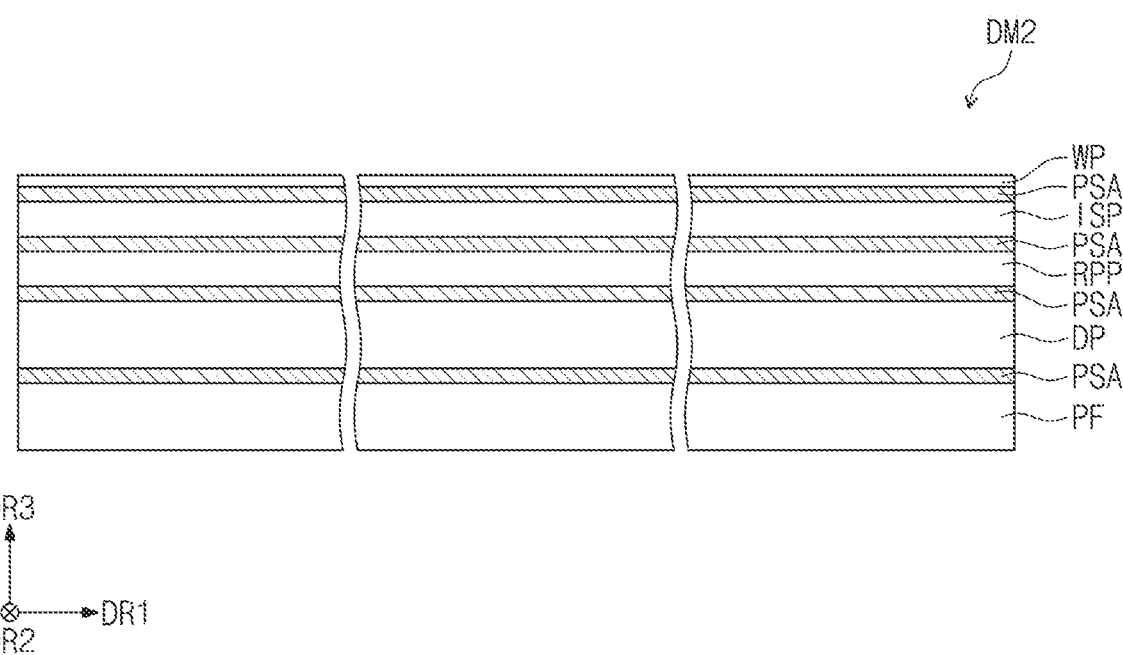
Figure 2C:
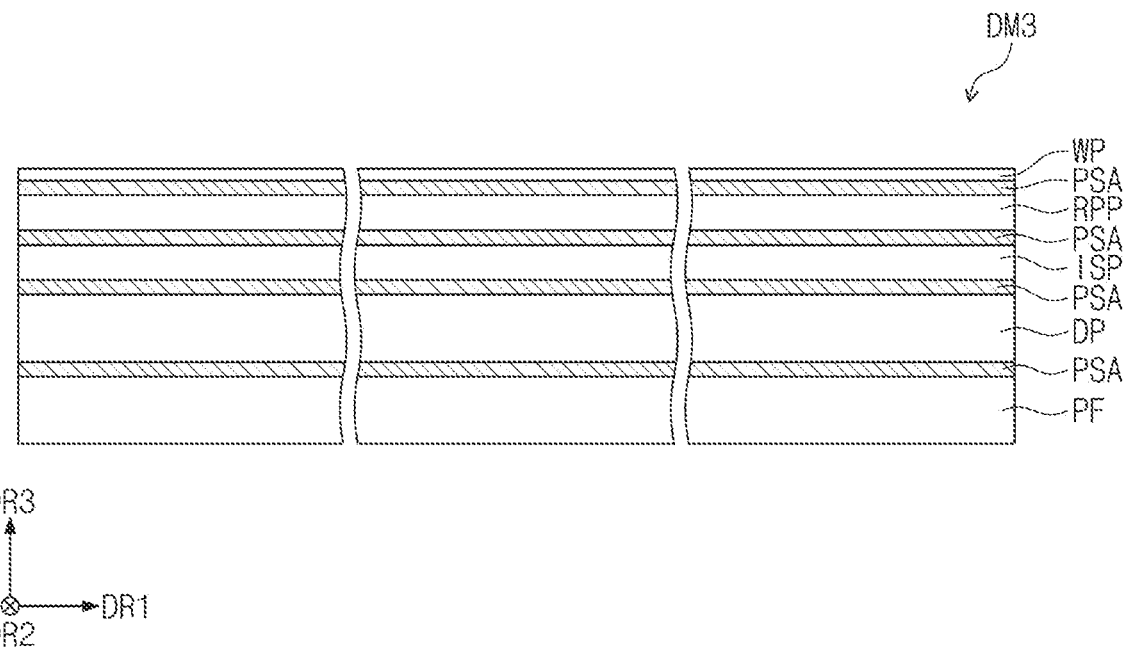

As shown in FIGS. 2B and 2C, display modules DM2 and DM3 may include the protective member PF, the display panel DP, the input sensing panel ISP, the anti-reflection panel RPP, and the window panel WP. A stacking order of the input sensing panel ISP and the anti-reflection panel RPP may be changed.

Figure 2D:
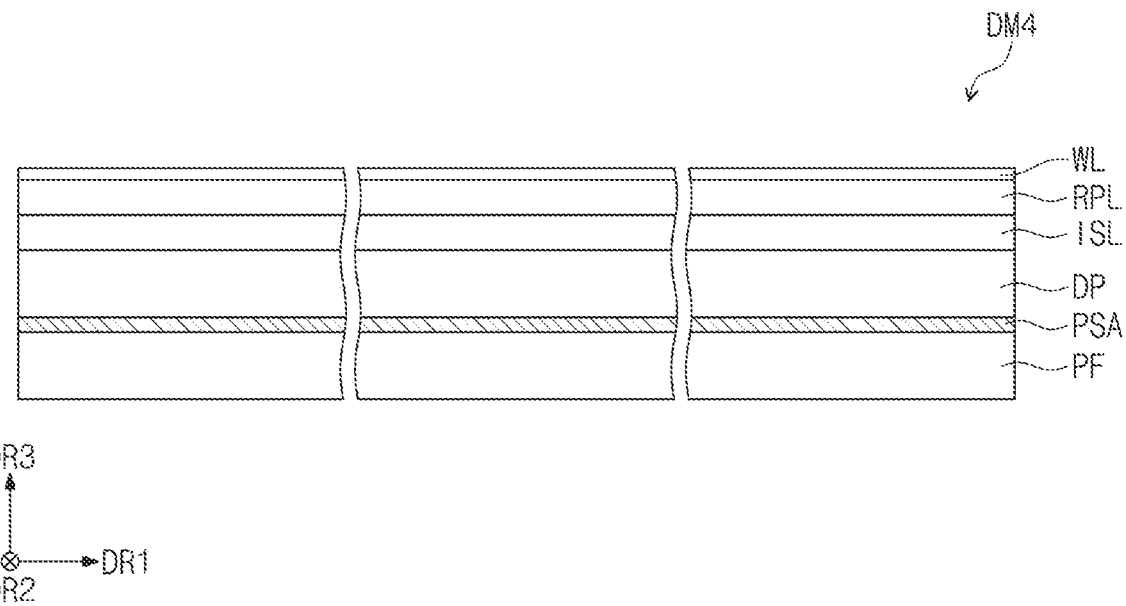

As shown in FIG. 2D, a display module DM4 may include the protective member PF, the display panel DP, the input sensing layer ISL, the anti-reflection layer RPL, and the window layer WL. The adhesive members may be omitted from the display module DM4, and the input sensing layer ISL, the anti-reflection layer RPL, and the window layer WL may be formed in a continuous process on a base surface provided to the display panel DP. A stacking order of the input sensing layer ISL and the anti-reflection layer RPL may be changed.

In this regard, the anti-reflection layer RPL may contain the liquid crystal coating type phase retarder and the liquid crystal coating type polarizer. The phase retarder and the polarizer may include a discotic liquid crystal layer having a tilt angle in one direction.

Figure 2E:
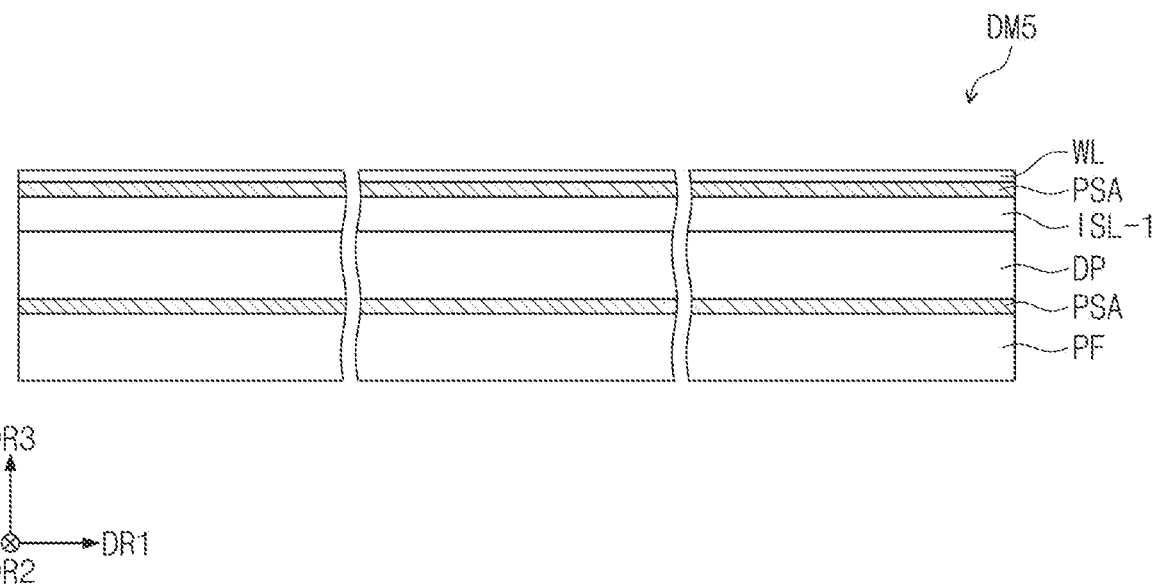
Figure 2F:
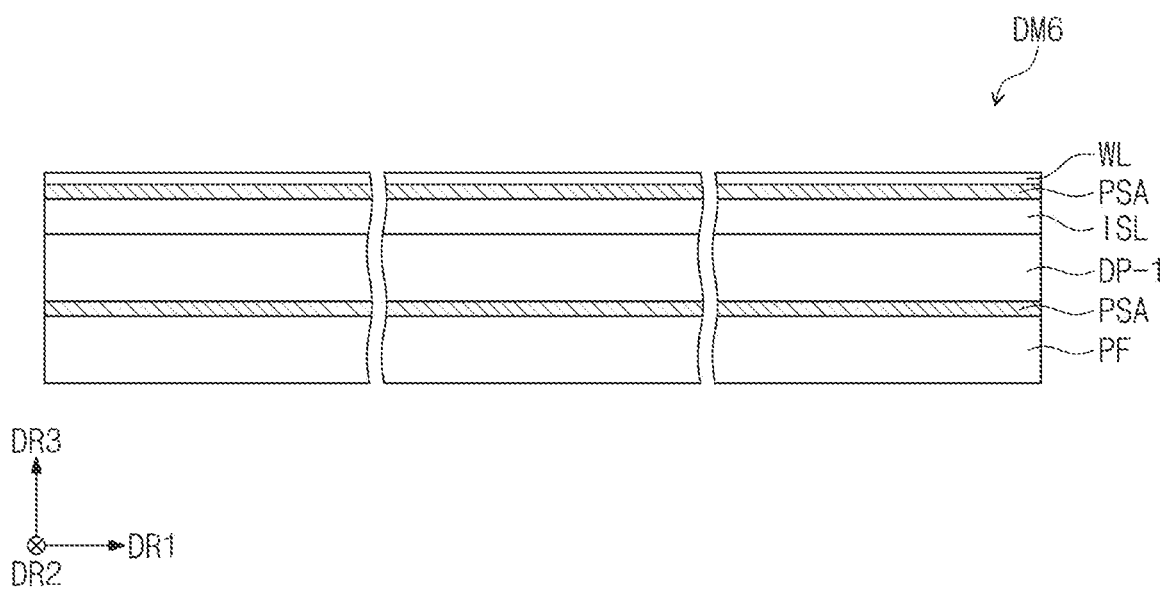

As shown in FIGS. 2E and 2F, display modules DM5 and DM6 may not include the separate anti-reflection layer. Unlike the input sensing panel ISP or the input sensing layer ISL shown in FIGS. 2A to 2D, an input sensing layer ISL-1 shown in FIG. 2E may further include the color filter having an anti-reflection function. Unlike the display panel DP shown in FIGS. 2A to 2D, a display panel DP-1 shown in FIG. 2F may further include the color filter having the anti-reflection function.

Figure 3A:
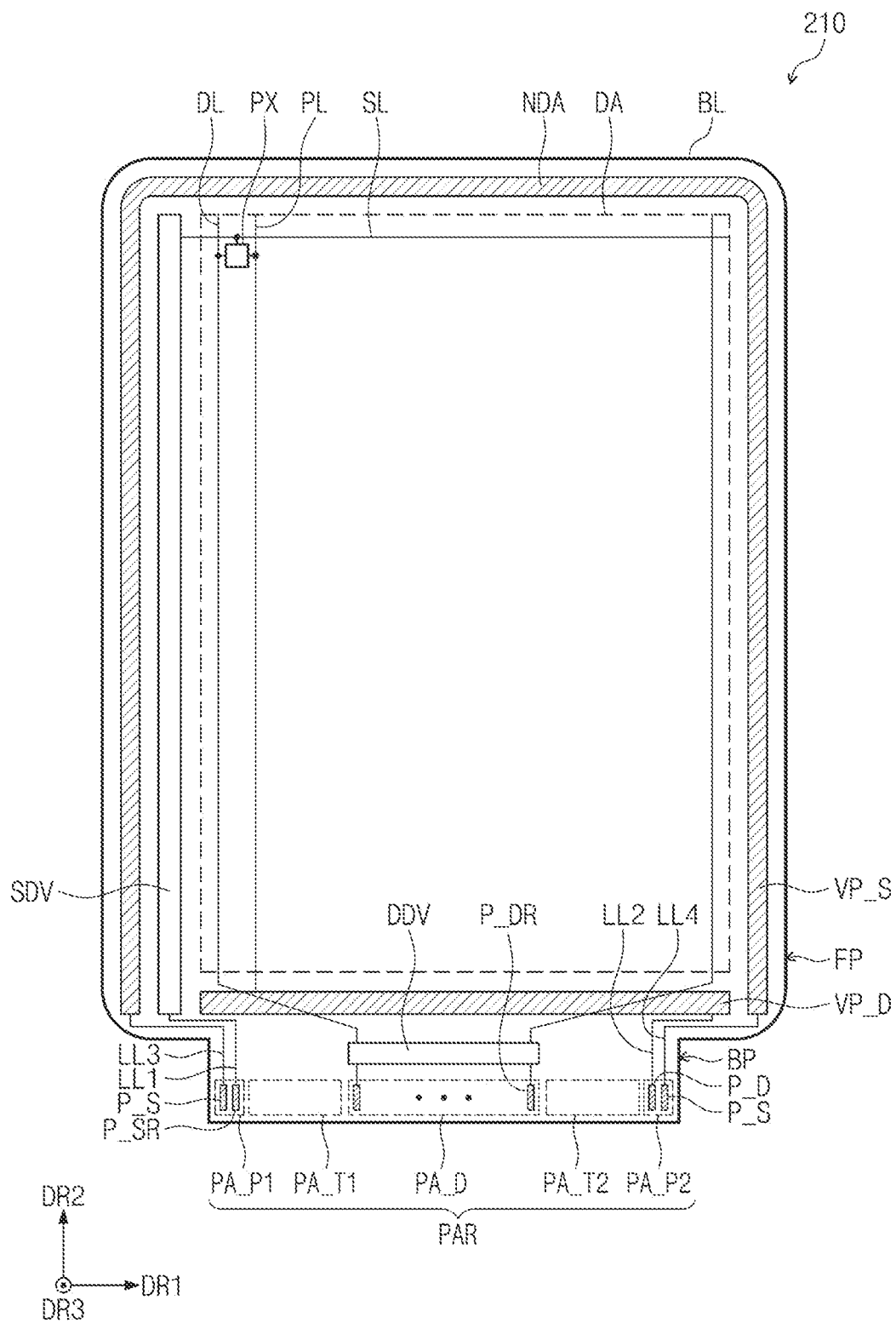
FIG. 3A is a plan view of a display portion according to an embodiment of the present disclosure.
Figure 3B:
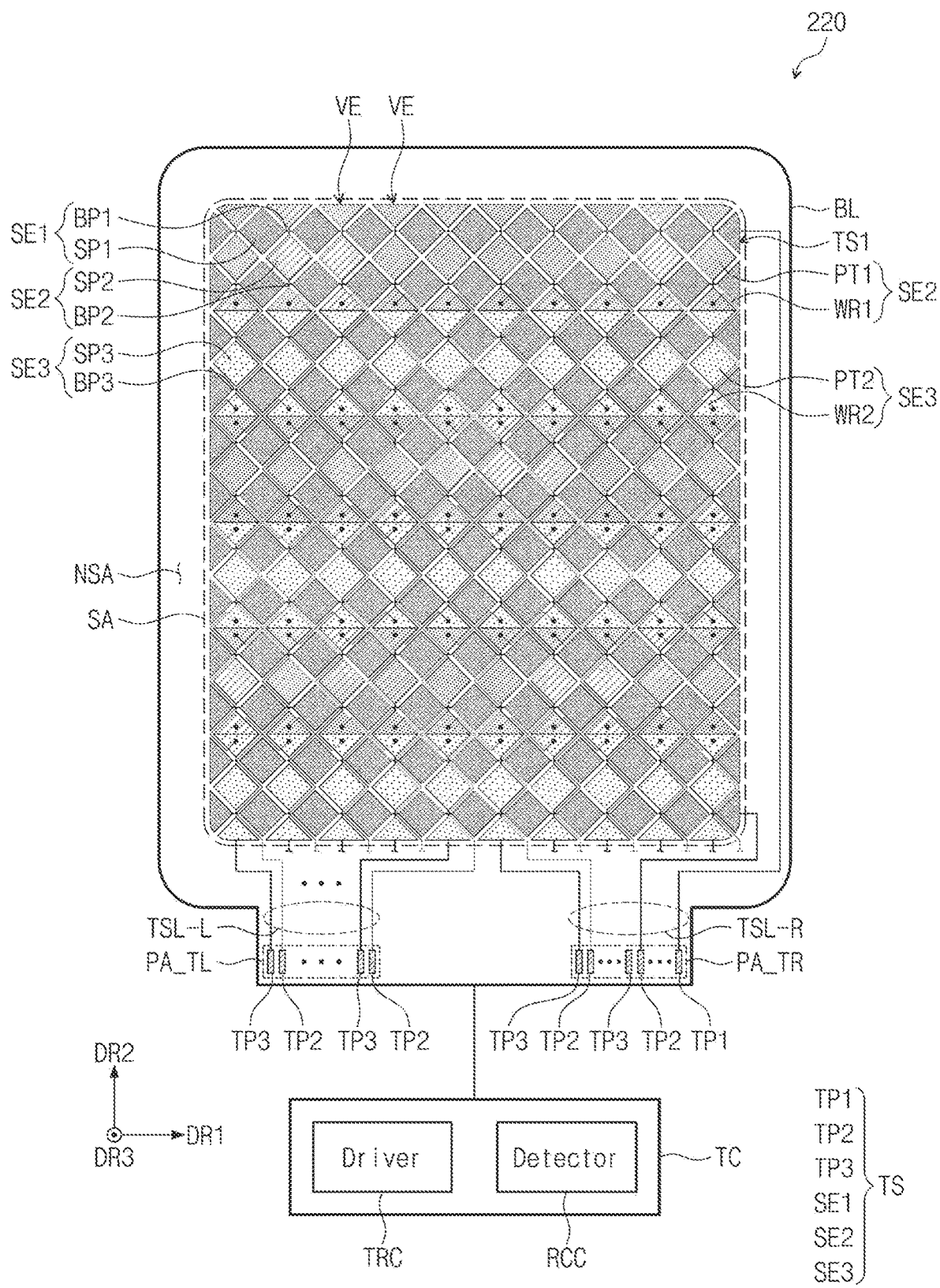
FIG. 3B is a plan view of a sensor portion according to an embodiment of the present disclosure.

FIG. 3A is a plan view of a display portion according to an embodiment of the present disclosure. FIG. 3B is a plan view of a sensor portion according to an embodiment of the present disclosure. In FIGS. 3A and 3B, some components are omitted for easy description. Hereinafter, aspects of embodiments according to the present disclosure will be described with reference to FIGS. 3A and 3B.

A display portion 210 may correspond to the aforementioned display panel DP (see FIG. 2A). Referring to FIG. 3A, the display portion 210 may include the base layer BL, a plurality of pixels PX, a scan driving circuit SDV, a data driving circuit DDV, a first power supply pattern VP_D, a second power supply pattern VP_S, and a plurality of signal lines SL, DL, PL, LL1, LL2, LL3, and LL4.

The base layer BL includes the flat portion FP and the bendable portion BP. The bendable portion BP is bent about a bending axis extending along the first direction DR1. The bendable portion BP may have a width in the first direction DR1 smaller than that of the flat portion FP. That is, a length of the bendable portion BP may be smaller than a length of the flat portion FP in the first direction DR1. The first direction DR1 may correspond to the direction of the bending axis of the bendable portion BP, and the smaller the length in the direction of the bending axis, the easier the bending is. However, this is shown as an example. The flat portion FP and the bendable portion BP may have the same width in the first direction DR1, and the present disclosure may not be limited to any one embodiment.

The display portion 210 may include a display area DA and a peripheral area NDA. The display area DA may be provided to the flat portion FP, and the peripheral area NDA may be provided to a remaining portion of the flat portion FP excluding the display area DA and to the bendable portion BP. In one example, the peripheral area NDA may include a pad area PAR defined in the bendable portion BP.

The display area DA may be an area where the pixels PX are located. The display area DA may be an area where the image IM is actually displayed. Accordingly, the display area DA may be an area in which display elements constituting the pixels PX are located. In the present embodiments, one pixel PX is shown as a rectangle and is shown to be located in the display area DA for easy illustration, but among components of the pixel PX, the display element, for example, a light-emitting element may be located in the display area DA, and a driving element, for example, a transistor, or the like for driving the same may be located in the peripheral area NDA. The present disclosure is not limited to any one embodiment.

The scan driving circuit SDV, the data driving circuit DDV, the first power supply pattern VP_D, and the second power supply pattern VP_S may be located in the peripheral area NDA. The scan driving circuit SDV, the data driving circuit DDV, the first power supply pattern VP_D, and the second power supply pattern VP_S may be electrically connected to the pixel PX via the signal lines SL, DL, PL, LL1, LL2, LL3, and LL4 or may be electrically connected to the external circuit board MB via the pad area PAR.

The signal lines SL, DL, PL, LL1, LL2, LL3, and LL4 may include the plurality of scan lines SL, the plurality of data lines DL, the plurality of power lines PL, and the plurality of control lines LL1, LL2, LL3, and LL4. In the present embodiments, signal lines connected to one pixel PX among the scan lines SL, the data lines DL, and the power lines PL are shown as an example for easy illustration.

The scan driving circuit SDV may be located in the peripheral area NDA. In the present embodiments, the scan driving circuit SDV is shown as being located between the display area DA and the second power supply pattern VP_S, but the present disclosure is not limited thereto. The scan driving circuit SDV may be located overlapping the display area DA. The scan driving circuit SDV is connected to a scan driving pad P_SR via the first control line LL1 to receive a scan control signal from the outside. The control signal may include a vertical start signal, a clock signal, or the like.

The scan lines SL may be arranged along the second direction DR2 and may extend along the first direction DR1 to be connected to the scan driving circuit SDV and the pixels PX. One scan line may connect the scan driving circuit SDV and pixels arranged in one row to each other. The pixels PX may receive a scan signal from the scan driving circuit SDV via the scan line.

The data driving circuit DDV may be located in the peripheral area NDA. In the present embodiments, the data driving circuit DDV is shown as being located between the display area DA and the pad area PAR, but the present disclosure is not limited thereto. In the present embodiments, the data driving circuit DDV is shown as being mounted on the base layer BL in a form of a chip, but the present disclosure is not limited thereto. The data driving circuit DDV may be omitted from the display portion 210 and provided on the circuit board MB (see FIG. 2A). The data driving circuit DDV is connected to data signal pads P_DR to receive a data control signal from the outside. The data control signal may include a horizontal start signal, a data clock signal, an image data signal, and the like.

The data lines DL may be arranged along the first direction DR1 and may be extended along the second direction DR2 and connected to the data driving circuit DDV and the pixels PX. One data line may connect the data driving circuit DDV and pixels arranged in one column to each other. The pixels PX may receive a data signal from the data driving circuit DDV via the data line. The data signal may be a signal including luminance or grayscale information of light displayed on the pixels PX.

Each power line PL may be parallel to each data line DL. That is, the power lines PL may be arranged along the first direction DR1 and may be extended along the second direction DR2 and connected to the first power supply pattern VP_D and the pixels PX. One power supply line may connect the first power supply pattern VP_D and the pixels arranged in one column to each other. The pixels PX may receive the data signal from the data driving circuit DDV via the power line. The data signal may be a signal including the luminance or grayscale information of light displayed on the pixels PX.

The first power supply pattern VP_D may be located in the peripheral area NDA. In the present embodiments, the first power supply pattern VP_D is shown as being located between the display area DA and the pad area PAR, but the present disclosure is not limited thereto. The first power supply pattern VP_D is connected to a first power pad PD_D via the second control line LL2 to receive a first power supply voltage from the outside. The first power supply voltage may be a constant voltage.

The second power supply pattern VP_S may be located in the peripheral area NDA. In the present embodiments, the second power supply pattern VP_S is shown as being located in the flat portion FP and extending along three sides of the display area DA, but the present disclosure is not limited thereto. The second power supply pattern VP_S is connected to second power pads P_S respectively via the third control line LL3 and the fourth control line LL4 to receive second power supply voltages from the outside. The second power supply voltage may be the constant voltage.

The pad area PAR may be located in the bendable portion BP. The circuit board MB (see FIG. 2A) may be connected to the electronic panel 200 (see FIG. 1B) via the pad area PAR. The pad area PAR may include a first control pad area PA_P1, a first sensor pad area PA_T1, a display pad area PA_D, a second sensor pad area PA_T2, and a second control pad area PA_P2. In one example, an arrangement relationship of the areas constituting the pad area PAR may be variously changed as long as the areas may be connected to the circuit board MB.

The first control pad area PA_P1 may be an area in which a pad among the second power pads P_S connected to the third control line LL3 and a scan control pad P_SR are located. The display pad area PA_D may be an area in which data signal pads P_DR are located. The second control pad area PA_P2 may be an area in which a first power pad P_D and a pad among the second power pads P_S connected to the fourth control line LL4 are located.

The first sensor pad area PA_T1 and the second sensor pad area PA_T2 may be areas in which pads connected to a sensor portion 220 are located. The first sensor pad area PA_T1 may be defined between the first control pad area PA_P1 and the display pad area PA_D, and the second sensor pad area PA_T2 may be defined between the second control pad area PA_P2 and the display pad area PA_D. According to the present disclosure, as the first sensor pad area PA_T1 and the second sensor pad area PA_T2 are arranged so as not to overlap the pad areas PA_D, PA_P1, and PA_P2 connected to the display portion 210, electrical interference between pads connected to the display portion 210 and the pads connected to the sensor portion 220 may be reduced. In addition, as the pads connected to the display portion 210 and the pads connected to the sensor portion 220 are arranged in one pad area PAR, the display portion 210 and the sensor portion 220 may be easily controlled via one circuit board MB. This is only an example. The first sensor pad area PA_T1 and the second sensor pad area PA_T2 may be defined at different locations and the present disclosure may not be limited to any one embodiment.

The sensor portion 220 may correspond to the aforementioned input sensing layer ISL (see FIG. 2A). Referring to FIG. 3B, the sensor portion 220 may include a sensor area SA and a peripheral area NSA. The sensor area SA may be provided on the flat portion FP, and the peripheral area NSA may be provided on a remaining portion of the flat portion FP excluding the sensor area SA and the bendable portion BP.

The sensor portion 220 includes an input sensor TS. The input sensor TS may detect external input information applied to the sensor area SA in response to an electrical signal. The input sensor TS may include a plurality of sensor electrodes SE1, SE2, and SE3 and a plurality of pads TP1, TP2, and TP3.

The sensor area SA may be an area where the external input is sensed. That is, the sensor area SA may be an area in which the plurality of sensor electrodes SE1, SE2, and SE3 are located. The sensor electrodes SE1, SE2, and SE3 may include a plurality of first sensor electrodes SE1, a plurality of second sensor electrodes SE2, and a plurality of third sensor electrodes SE3.

The first sensor electrodes SE1 may be electrodes arranged along the second direction DR2 and extended along the first direction DR1. Each of the first sensor electrodes SE1 may include a first sensor portion SP1 and a first connection portion BP1. The first sensor portion SP1 and the first connection portion BP1 respectively include a plurality of first sensor portions and a plurality of first connection portions, and are alternately arranged along the first direction DR1 and connected to each other to form one first sensor electrode SE1.

The second sensor electrodes SE2 may be electrodes arranged along the first direction DR1 and extended along the second direction DR2. Each of the second sensor electrodes SE2 may include a first sensor pattern PT1 and a first intersecting wire WR1.

The first sensor pattern PT1 may include a second sensor portion SP2 and a second connection portion BP2. The second sensor portion SP2 and the second connection portion BP2 respectively include a plurality of second sensor portions and a plurality of second connection portions, and are alternately arranged along the second direction DR2 and connected to each other to form one first sensor pattern PT1.

The first intersecting wire WR1 extends along the second direction DR2 and is connected to the first sensor pattern PT1 adjacent in the second direction. The first intersecting wire WR1 is located in the sensor area SA to connect the two first sensor patterns PT1 spaced apart from each other in the second direction DR2. The first intersecting wire WR1 may be spaced apart from a second sensor pattern PT2 in the first direction. The first intersecting wire WR1 may electrically connect the two first sensor patterns PT1 to each other via a space between the first sensor electrodes SE1 and the third sensor electrodes SE3.

The first intersecting wire WR1 may be designed so as not to be short-circuited with components other than the first sensor pattern PT1. The first intersecting wire WR1 is not in contact with the second patterns P2, a second intersecting wire WR2, and the first electrode SE1. Accordingly, the first sensor patterns PT1 may be electrically connected to other components without being short-circuited.

The third sensor electrodes SE3 may be electrodes arranged along the first direction DR1 and extended along the second direction DR2. The third sensor electrodes SE3 may be alternately arranged with the second sensor electrodes SE2 along the second direction DR2. Each of the third sensor electrodes SE3 may include the second sensor pattern PT2 and the second intersecting wire WR2.

The second sensor pattern PT2 may include a third sensor portion SP3 and a third connection portion BP3. The third sensor portion SP3 and the third connection portion BP3 respectively include a plurality of third sensor portions and a plurality of third connection portions, and are alternately arranged along the second direction DR2 and connected to each other to form one second sensor pattern PT2. The second sensor pattern PT2 may include a plurality of second sensor patterns alternately arranged with the first sensor patterns PT1 along the second direction DR2.

The second intersecting wire WR2 is connected to the second sensor pattern PT2 adjacent in the second direction. The second intersecting wire WR2 is located in the sensor area SA and connects the two second sensor patterns PT2 spaced apart from each other in the second direction DR2. The second intersecting wire WR2 may be spaced apart from the first sensor pattern PT1 in the first direction. The second intersecting wire WR2 may electrically connect the two second sensor patterns PT2 via a space between the first sensor electrodes SE1 and the second sensor electrodes SE2.

The second intersecting wire WR2 may be designed so as not to be short-circuited with components other than the second sensor pattern PT2. Therefore, the second intersecting wire WR2 is not in contact with the first sensor pattern PT1, the first intersecting wire WR1, and the first electrode SE1. Accordingly, the second sensor pattern PT2 may be electrically connected to other components without being short-circuited.

The pads connect the input sensor TS and a sensor circuit TC to each other. The pads may include the first pad TP1, the second pad TP2, and the third pad TP3. The first pad TP1, the second pad TP2, and the third pad TP3 may include a plurality of first pads, a plurality of second pads, and a plurality of third pads, respectively. The first pads TP1 are respectively connected to the first electrodes SE1, the second pads TP2 are respectively connected to the second electrodes SE2, and the third pads TP3 are respectively connected to the third electrodes SE3. One column electrode VE may be connected via the two pads TP2 and TP3.

The sensor circuit TC may include a driver and a detector. The driver may provide a driving signal to the input sensor. In the present embodiments, a first signal may be the driving signal, and the driver may provide the first signal to each of the first electrodes.

The detector may receive a detection signal from the input sensor. The detection signal may include location information of the external input provided to the input sensor. According to an embodiment, each of a second signal and a third signal may be the detection signal, and the second signal and the third signal may be transmitted simultaneously or not simultaneously. For example, when the input sensor according to the present disclosure is driven in a mutual capacitance scheme, the second signal may be a signal including a change in a capacitance between the first electrodes and the second electrodes, and the third signal may be a signal including a change in a capacitance generated between the first electrodes and the third electrodes. The detector may detect whether the external input exists and a location of the external input via the second signal and the third signal respectively transmitted from the second electrodes and the third electrodes.

In one example, the detection signal may include a capacitance between the second electrodes and the third electrodes in addition to the capacitance generated with the first electrodes. The capacitance generated between the second electrode and the third electrode adjacent to each other may be noise for the external input information.

The detector according to the present disclosure may detect information on the external input detected from one column electrode based on an output signal obtained by subtracting one from the other among the second signal and the third signal. In the input sensor according to the present disclosure, one column electrode for transmitting the detection signal is composed of the second electrode and the third electrode that are alternately arranged with each other along a column direction. Therefore, a signal with reduced noise present in a channel may be detected as a signal including the external input information, so that sensitivity of the input sensor may be relatively improved.

Alternatively, the first signal may be the detection signal and each of the second signal and the third signal may be the driving signal. In this regard, the driver may output a difference between the second signal and the third signal as the driving signal, thereby minimizing noise generation resulted from coupling between the display portion 210 and the sensor portion 220. Accordingly, the sensitivity of the input sensor may be relatively improved.

The electronic panel according to the present disclosure may include a sensor electrode including two electrodes alternately arranged along an extension direction. The sensor electrode may reduce noise generated in the sensor area SA by subtracting one from the other among signals transmitted to the two electrodes. Accordingly, the input sensor having relatively improved sensitivity may be provided by improving a signal-to-noise ratio (SNR).

Figure 4:
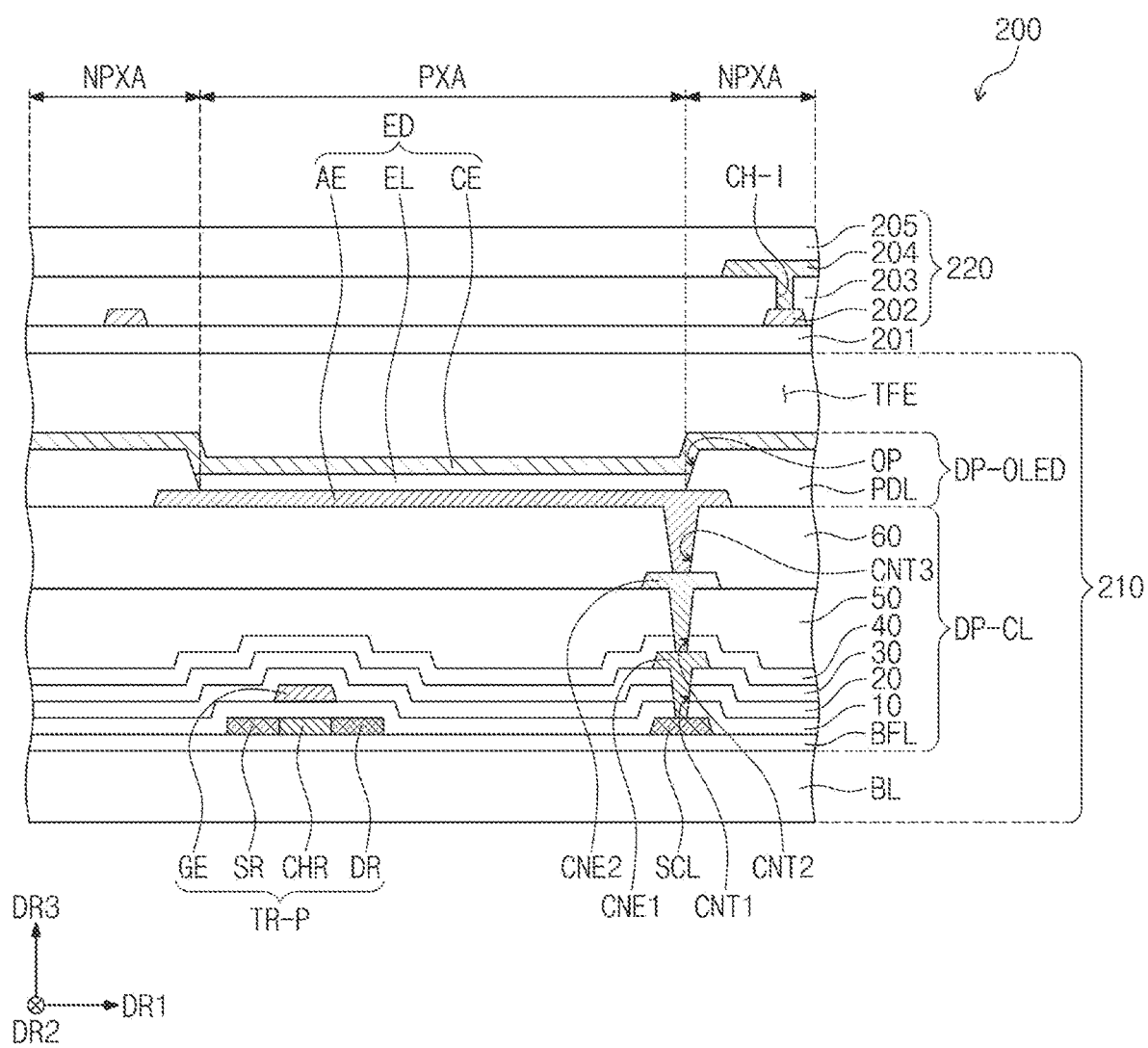
FIG. 4 is a cross-sectional view of an electronic panel according to an embodiment of the present disclosure.

FIG. 4 is a cross-sectional view of an electronic panel according to an embodiment of the present disclosure. Referring to FIG. 4, in the electronic panel 200, the sensor portion 220 may be located on the display portion 210. However, this is shown as an example. A stacking relationship between the sensor portion 220 and the display portion 210 may be variously changed, and the present disclosure is not limited to any one embodiment.

The display portion 210 may include the base layer BL, a circuit element layer DP-CL, a display element layer DP-OLED, and an encapsulation layer TFE.

The base layer BL may provide a base surface on which the circuit element layer DP-CL is located. The base layer BL may be a rigid substrate or a flexible substrate capable of being bent, folded, or rolled. The base layer BL may be a glass substrate, a metal substrate, a polymer substrate, or the like. However, the embodiments of the present disclosure are not limited thereto, and the base layer BL may be an inorganic layer, an organic layer, or a composite material layer.

The base layer BL may have a multi-layer structure. For example, the base layer BL may include a first synthetic resin layer, a multi-layered or single-layered inorganic layer, and a second synthetic resin layer located on the multi-layered or single-layered inorganic layer. Each of the first and second synthetic resin layers may contain a polyimide-based resin, but the present disclosure may not be particularly limited.

The circuit element layer DP-CL may be located on the base layer BL. The circuit element layer DP-CL may include an insulating layer, a semiconductor pattern, a conductive pattern, a signal line, and the like. The insulating layer, the semiconductor layer, and a conductive layer may be formed on the base layer BL by a scheme such as coating or deposition, and then the insulating layer, the semiconductor layer, and the conductive layer may be selectively patterned via a plurality of photolithography processes. Thereafter, the semiconductor pattern, the conductive pattern, and the signal line included in the circuit element layer DP-CL may be formed.

At least one inorganic layer may be formed on a top surface of the base layer BL. The inorganic layer may contain at least one of aluminum oxide, titanium oxide, silicon oxide, silicon oxynitride, zirconium oxide, or hafnium oxide. The inorganic layer may be formed in multiple layers. The multiple layers of the inorganic layer may constitute a barrier layer and/or a buffer layer. In the present embodiments, the electronic panel 200 is illustrated as including a buffer layer BFL as one layer of the inorganic layer.

The buffer layer BFL may relatively improve a bonding strength between the base layer BL and the semiconductor pattern. The buffer layer BFL may contain at least one of silicon oxide, silicon nitride, or silicon oxynitride. For example, the buffer layer BFL may include a structure in which a silicon oxide layer and a silicon nitride layer are alternately stacked.

The semiconductor pattern may be located on the buffer layer BFL. The semiconductor pattern may contain polysilicon. However, the present disclosure may not be limited thereto, and the semiconductor pattern may contain amorphous silicon, low-temperature polycrystalline silicon, or an oxide semiconductor.

FIG. 4 only shows a portion of the semiconductor pattern, and the semiconductor pattern may be further located in other areas. The semiconductor pattern may be arranged in a specific rule across the pixels. The semiconductor pattern may have different electrical properties depending on whether it is doped. The semiconductor pattern may include a first area having high conductivity and a second area having low conductivity. The first area may be doped with an N-type dopant or a P-type dopant. A P-type transistor may include a doped area doped with the P-type dopant, and an N-type transistor may include a doped area doped with the N-type dopant. The second area may be a non-doped area or an area doped with a concentration lower than that of the first area.

The conductivity of the first area may be greater than that of the second area, and the first area may substantially serve as an electrode or a signal line. The second area may substantially correspond to an active (or a channel) of a transistor. In other words, a portion of the semiconductor pattern may be the active of the transistor, another portion may be a source or a drain of the transistor, and another portion may be the connection electrode or the connection signal line.

Each of the pixels may have an equivalent circuit including seven transistors, one capacitor, and a light-emitting element, and an equivalent circuit diagram of the pixel may be modified in various forms. FIG. 4 shows one transistor TR-P and a light-emitting element ED included in one pixel as an example.

A source SR, a channel CHR, and a drain DR of the transistor TR-P may be formed in the semiconductor pattern. The source SR and the drain DR may be located on opposite side of the channel CHR on a cross-section. FIG. 4 shows a portion of a signal line SCL located on the same layer as the semiconductor pattern. Although not separately shown, the signal line SCL may be electrically connected to the transistor TR-P on a plane.

A first insulating layer 10 may be located on the buffer layer BFL. The first insulating layer 10 may overlap a plurality of pixels in a common manner, and may cover the semiconductor pattern. The first insulating layer 10 may be an inorganic layer and/or an organic layer, and may have a single-layer or multi-layer structure. The first insulating layer 10 may contain at least one of aluminum oxide, titanium oxide, silicon oxide, silicon nitride, silicon oxynitride, zirconium oxide, or hafnium oxide. According to an embodiment, the first insulating layer 10 may be a single-layered silicon oxide layer. In addition to the first insulating layer 10, an insulating layer of the circuit element layer DP-CL to be described later may be an inorganic layer and/or an organic layer, and may have a single-layer or multi-layer structure. The inorganic layer may contain at least one of the above materials, but embodiments according to the present disclosure are not limited thereto.

A gate GE of the transistor TR-P is located on the first insulating layer 10. The gate GE may be a portion of a metal pattern. The gate GE overlaps the channel CHR. In a process of doping the semiconductor pattern, the gate GE may function as a mask.

A second insulating layer 20 may be located on the first insulating layer 10 and may cover the gate GE. The second insulating layer 20 may overlap the pixels in a common manner. The second insulating layer 20 may be an inorganic layer and/or an organic layer, and may have a single-layer or multi-layer structure. According to an embodiment, the second insulating layer 20 may be a single-layered silicon oxide layer.

A third insulating layer 30 may be located on the second insulating layer 20. According to an embodiment, the third insulating layer 30 may be a single-layered silicon oxide layer. A first connection electrode CNE1 may be located on the third insulating layer 30. The first connection electrode CNE1 may be connected to the signal line SCL via a contact hole CNT1 extending through the first, second, and third insulating layers 10, 20, and 30.

A fourth insulating layer 40 may be located on the third insulating layer 30. The fourth insulating layer 40 may be a single-layered silicon oxide layer. A fifth insulating layer 50 may be located on the fourth insulating layer 40. The fifth insulating layer 50 may be an organic layer.

A second connection electrode CNE2 may be located on the fifth insulating layer 50. The second connection electrode CNE2 may be connected to the first connection electrode CNE1 via a contact hole CNT2 extending through the fourth insulating layer 40 and the fifth insulating layer 50.

A sixth insulating layer 60 may be located on the fifth insulating layer 50 and may cover the second connection electrode CNE2. The sixth insulating layer 60 may be an organic layer. The display element layer DP-OLED may be located on the circuit element layer DP-CL. The display element layer DP-OLED may contain the light-emitting element ED. For example, the display element layer DP-OLED may contain the organic light-emitting material, the quantum dots, the quantum rods, a micro LED, or a nano LED. The light-emitting element ED may include a first electrode AE, a light-emitting layer EL, and a second electrode CE.

The first electrode AE may be located on the sixth insulating layer 60. The first electrode AE may be connected to the second connection electrode CNE2 via a contact hole CNT3 extending through the sixth insulating layer 60.

A pixel defining layer PDL may be located on the sixth insulating layer 60 and may cover a portion of the first electrode AE. An opening OP is defined in the pixel defining layer PDL. The opening OP of the pixel defining layer PDL exposes at least a portion of the first electrode AE. In the present embodiments, a light-emitting area PXA is defined to correspond to a partial area of the first electrode AE exposed by the opening OP. A non-light-emitting area NPXA may surround the light-emitting area PXA.

The light-emitting layer EL may be located on the first electrode AE. The light-emitting layer EL may be located in the opening OP. That is, the light-emitting layer EL may be separately formed for each of the pixels. When the light-emitting layer EL is separately formed for each of the pixels, each of the light-emitting layers EL may emit light with a color of at least one of blue, red, or green. However, embodiments according to the present disclosure are not limited thereto, and the light-emitting layer EL may be formed in an integral shape and provided in the pixels in a common manner. In this case, the light-emitting layer EL may provide blue light or white light.

The second electrode CE may be located on the light-emitting layer EL. The second electrode CE may have an integral shape and be located in the plurality of pixels in a common manner. A common voltage may be provided to the second electrode CE, and the second electrode CE may be referred to as a common electrode.

According to an embodiment, a hole control layer may be located between the first electrode AE and the light-emitting layer EL. The hole control layer may be located in the light-emitting area PXA and the non-light-emitting area NPXA in a common manner. The hole control layer may include a hole transport layer and may further include a hole injection layer. An electronic control layer may be located between the light-emitting layer EL and the second electrode CE. The electron control layer may include an electron transport layer and may further include an electron injection layer. Each of the hole control layer and the electron control layer may be formed in the plurality of pixels in a common manner using an open mask.

The encapsulation layer TFE may be located on the display element layer DP-OLED. The encapsulation layer TFE may include sequentially stacked inorganic layer, organic layer, and inorganic layer, but the layers constituting the encapsulation layer TFE may not be limited thereto.

The inorganic layers may protect the display element layer DP-OLED from moisture and oxygen, and the organic layer may protect the display element layer DP-OLED from foreign substances such as dust particles. The inorganic layers may include a silicon nitride layer, a silicon oxynitride layer, a silicon oxide layer, a titanium oxide layer, an aluminum oxide layer, or the like. The organic layer may include an acryl-based organic layer, but the present disclosure may not be limited thereto.

The sensor portion 220 may be located on the encapsulation layer TFE. According to an embodiment, the sensor portion 220 may be formed directly on a top surface of the encapsulation layer TFE via a continuous process. However, this is shown as an example. The sensor portion 220 may be formed separately and attached onto the encapsulation layer TFE via an adhesive layer or the like.

The sensor portion 220 may include a sensor base layer 201, a first conductive layer 202, a sensor insulating layer 203, a second conductive layer 204, and a cover insulating layer 205. The sensor base layer 201 may be an inorganic layer containing at least one of silicon nitride, silicon oxynitride, or silicon oxide. Alternatively, the sensor base layer 201 may be an organic layer containing an epoxy resin, an acrylic resin, or an imide-based resin. The sensor base layer 201 may have a single-layer structure or a structure of multiple layers stacked along the third direction DR3.

Each of the sensor electrodes HE and VE (see FIG. 2B) may constitute at least one of the first conductive layer 202 or the second conductive layer 204. For example, the first sensor portion SP1, the second sensor portion SP2, and the first connection portion BP1 may constitute the second conductive layer 204, and the second connection portion BP2 may constitute the first conductive layer 202. Alternatively, the second connection portion BP2 may constitute the second conductive layer 204 and the first connection portion BP1 may constitute the first conductive layer 202. Alternatively, one of the first sensor electrode HE and the second sensor electrode VE may constitute the first conductive layer 202 and the other may constitute the second conductive layer 204. The sensor electrodes HE and VE according to an embodiment of the present disclosure may be designed in various structures as long as they are not electrically short-circuited to each other, and the present disclosure may not be limited to any one embodiment.

Each of the first conductive layer 202 and the second conductive layer 204 may have a single-layer structure or a structure of multiple layers stacked along the third direction DR3.

The conductive layer of the single-layer structure may include a metal layer or a transparent conductive layer. The metal layer may contain molybdenum, silver, titanium, copper, aluminum, or an alloy thereof. The transparent conductive layer may contain transparent conductive oxide such as indium tin oxide (ITO), indium zinc oxide (IZO), zinc oxide (ZnO), or indium zinc tin oxide (IZTO). In addition, the transparent conductive layer may contain a conductive polymer such as PEDOT, a metal nanowire, graphene, and the like.

The conductive layer of the multi-layer structure may include metal layers. The metal layers may have, for example, a three-layer structure of titanium/aluminum/titanium. The conductive layer of the multi-layer structure may include at least one metal layer and at least one transparent conductive layer.

At least one of the sensor insulating layer 203 or the cover insulating layer 205 may include an inorganic film. The inorganic film may contain at least one of aluminum oxide, titanium oxide, silicon oxide, silicon nitride, silicon oxynitride, zirconium oxide, or hafnium oxide.

At least one of the sensor insulating layer 203 or the cover insulating layer 205 may include an organic film. The organic film may include at least one of the acrylic resin, a methacrylic resin, polyisoprene, a vinyl-based resin, an epoxy-based resin, an urethane-based resin, a cellulose-based resin, a siloxane-based resin, a polyimide-based resin, a polyamide-based resin, or a perylene-based resin.

Figure 5:
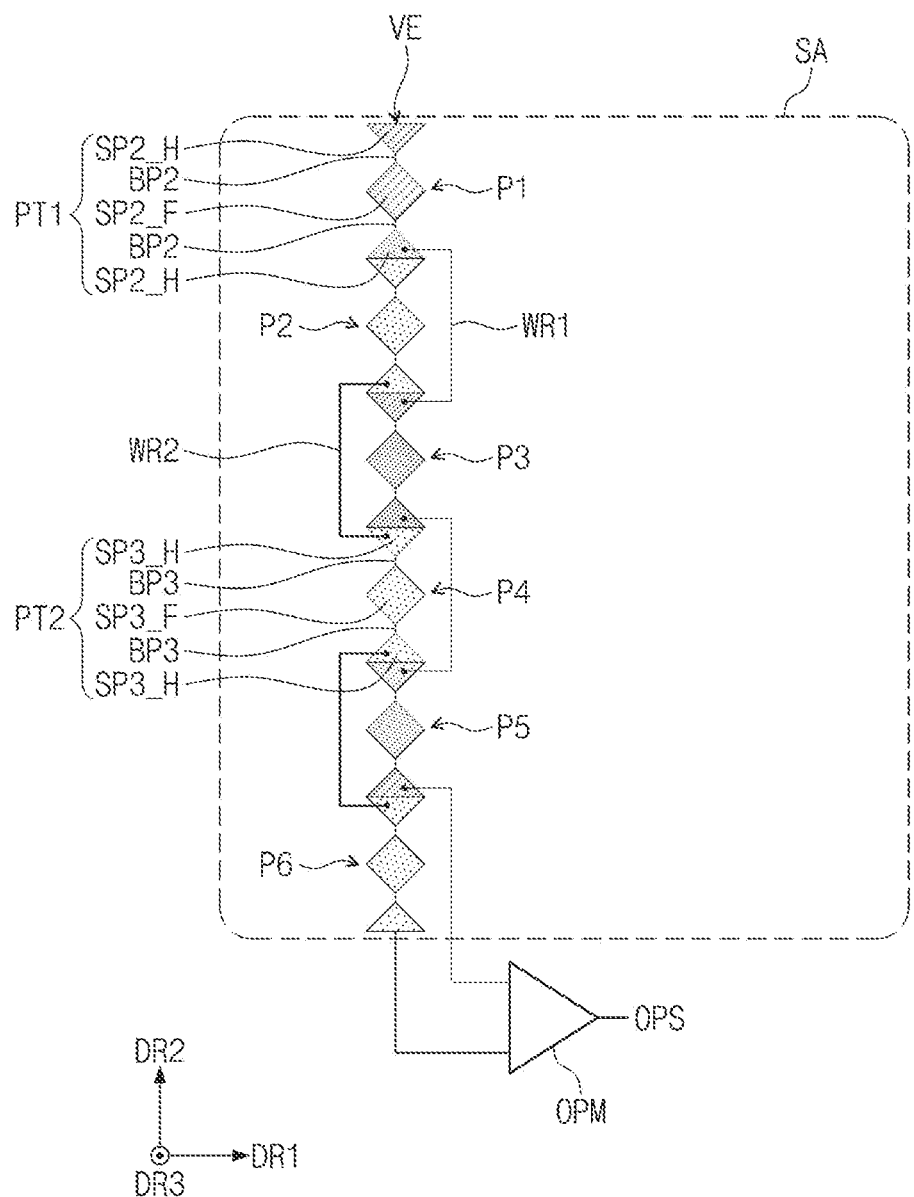
FIG. 5 is a plan view schematically showing a portion of an input sensor according to an embodiment of the present disclosure.

FIG. 5 is a plan view schematically showing a portion of an input sensor according to an embodiment of the present disclosure. FIG. 5 shows the second electrode SE2 and the third electrode SE3 constituting one column electrode VE. Hereinafter, the present disclosure will be described with reference to FIG. 5.

According to an embodiment, one column electrode VE may include first to sixth patterns P1 to P6. The first to sixth patterns P1 to P6 are arranged along the second direction DR2. The first to sixth patterns P1 to P6 may be spaced apart from each other in the second direction DR2. In one example, this is shown as an example. The number of patterns constituting one column electrode VE may be variously changed and the present disclosure may not be limited to any one embodiment.

Among the first to sixth patterns P1 to P6, odd-numbered patterns P1, P3, and P5 may be electrically connected to each other. According to an embodiment, the odd-numbered patterns P1, P3, and P5 and the first intersecting wire WR1 connecting the odd-numbered patterns P1, P3, and P5 to each other constitute one second electrode SE2. That is, each of the odd-numbered patterns P1, P3, and P5 may correspond to the above-described first sensor pattern PT1.

When taking the first pattern P1 among the odd-numbered patterns P1, P3, and P5 as an example, the first pattern P1 may include the second sensor portions and the second connection portions arranged along the second direction DR2. Each of the second sensor portions may have a rhombus shape, but the present disclosure may not be limited thereto. The second sensor portions and the second connection portions may be alternately arranged along the second direction DR2.

The first pattern P1 may have a shape in which a triangle, a rhombus, and a triangle arranged along the second direction DR2 are connected to each other. The rhombus may correspond to a shape of the second sensor portion, and the triangle may correspond to one of two triangles arranged along the second direction DR2, which are divided from the second sensor portion. The rhombus and the triangle adjacent thereto may be connected to each other via the second connection portion. That is, substantially, the first pattern P1 may have a shape in which a portion SP2_H of the second sensor portion—the second connection portion BP2—a second sensor portion SP2_F—the second connection portion BP2—the portion SP2_H of the second sensor portion are connected to each other along the second direction DR2. According to an embodiment, the second connection portion and the second sensor portion are located on the same layer. Accordingly, the first pattern P1 may have an integral shape. However, this is shown as an example. The second connection portions may be located on a layer different from that of the triangle—the rhombus—the triangle and connected thereto, and the present disclosure may not be limited thereto.

Among the first to sixth patterns P1 to P6, even-numbered patterns P2, P4, and P6 may be electrically connected to each other. According to an embodiment, the even-numbered patterns P2, P4, and P6 and the second intersecting wire WR2 connecting the even-numbered patterns P2, P4, and P6 to each other constitute one third electrode SE3. That is, each of the even-numbered patterns P2, P4, and P6 may correspond to the aforementioned second sensor pattern PT2.

When taking the second pattern P2 among the even-numbered patterns P2, P4, and P6 as an example, the second pattern P2 may include the third sensor portions and the third connection portions arranged along the second direction DR2. Each of the third sensor portions may have the rhombus shape, but the present disclosure may not be limited thereto. The third sensor portions and the third connection portions may be alternately arranged along the second direction DR2.

The second pattern P2 may have the same shape as the first sensor pattern PT1. Accordingly, the second sensor pattern PT2 may have the shape in which the triangle, the rhombuses, and the triangle arranged along the second direction DR2 are connected to each other. Substantially, the second pattern P2 may have the shape in which the portion SP2_H of the second sensor portion—the second connection portion BP2—the second sensor portion SP2_F—the second connection portion BP2—the portion SP2_H of the second sensor portion are connected to each other along the second direction DR2. A portion of a first triangular shape of the second pattern P2 may face a portion of a last triangular shape of the first pattern P1 in the second direction. That is, the first pattern P1 and the second pattern P2 may include sides facing each other in the second direction DR2, which may be sides of the respective triangles in the present embodiments. In one example, this is shown as an example. As long as the first pattern P1 and the second pattern P2 may be alternately arranged along the second direction DR2, the shapes of the first pattern P1 and the second pattern P2 may be variously changed. For example, the second pattern P2 may have the same area size as the first pattern P1 but may have a shape different from that of the first pattern P1, or may have an area size different from that of the first pattern P1, and the present disclosure may not be limited to any one embodiment.

According to an embodiment, the first intersecting wire WR1 and the second intersecting wire WR2 may be alternately arranged along the second direction DR2, and alternately arranged on left and right sides of the first to sixth patterns P1 to P6. That is, the first intersecting wire WR1 may include a plurality of first intersecting wires, be arranged along the second direction DR2, and be arranged on the right side of the first to sixth patterns P1 to P6, and the second intersecting wire WR2 may include a plurality of second intersecting wires, be arranged along the second direction DR2, and be arranged on the left side of the first to sixth patterns P1 to P6. According to the present disclosure, the first intersecting wire WR1 and the second intersecting wire WR2 are located separately from each other on the left and right sides of the first to sixth patterns P1 to P6, so that interference between the first intersecting wire WR1 and the second intersecting wire WR2 may be prevented or reduced. However, this is shown as an example. As long as the first intersecting wire WR1 and the second intersecting wire WR2 are located on different layers or not short-circuited with each other, the arrangement locations of the first intersecting wire WR1 and the second intersecting wire WR2 may be changed in various ways, and not be limited to one embodiment.

As shown in FIG. 5, one second electrode SE2 and one third electrode SE3 may be connected to one output part OPM to output an output signal OPS. The output part OPM may be one of the components of a detector RCC (see FIG. 3B), or may be a differential amplifier. That is, the output signal OPS may be a signal corresponding to a signal obtained by subtracting a signal for one from a signal for the other of the second electrode SE2 and the third electrode SE3. As described above, the sensor circuit TC (see FIG. 3B) may obtain touch information in the sensor area SA via the output signal OPS.

As the patterns P1, P3, and P5 constituting the second electrode SE2 and the patterns P2, P4, and P6 constituting the third electrode SE3 are alternately arranging in one column, a signal difference may occur for each two alternating patterns within one column electrode VE. According to the present disclosure, a signal transmitted by the column electrode VE may be the detection signal. Accordingly, a touch detection signal may be compensated for based on the difference between the signals received from the second electrode SE2 and the third electrode SE3, and noise that may occur when driving the vertical electrodes VE at a time difference may be prevented or reduced. Accordingly, the input sensor having relatively improved signal-to-noise ratio and the relatively improved sensitivity may be provided.

Alternatively, the signal transmitted by the column electrode VE may be the driving signal. Accordingly, a touch driving signal may be compensated for based on the difference between the signals received from the second electrode SE2 and the third electrode SE3, and the noise that may occur when the vertical electrodes VE are driven at the time difference may be prevented or reduced. Accordingly, the input sensor with the relatively improved SNR and the relatively improved sensitivity may be provided.

In one example, aspects of an embodiment have been described based on the column electrode VE, the present disclosure may not be limited thereto and may be applied to a row electrode. That is, the row electrode may be composed of two electrodes alternately arranged along the first direction DR1. Specifically, the row electrode may include a plurality of patterns arranged along the first direction DR1, odd-numbered patterns may constitute one electrode along the first direction DR1, and even-numbered patterns may constitute another electrode. In addition, each of the column electrode VE and the row electrode may be composed of a plurality of electrodes. The input sensor according to an embodiment of the present disclosure may be formed in various embodiments as long as it may include electrodes that are alternately arranged along one direction and transmit different signals, and the present disclosure may not be limited to any one embodiment.

Figure 6A:
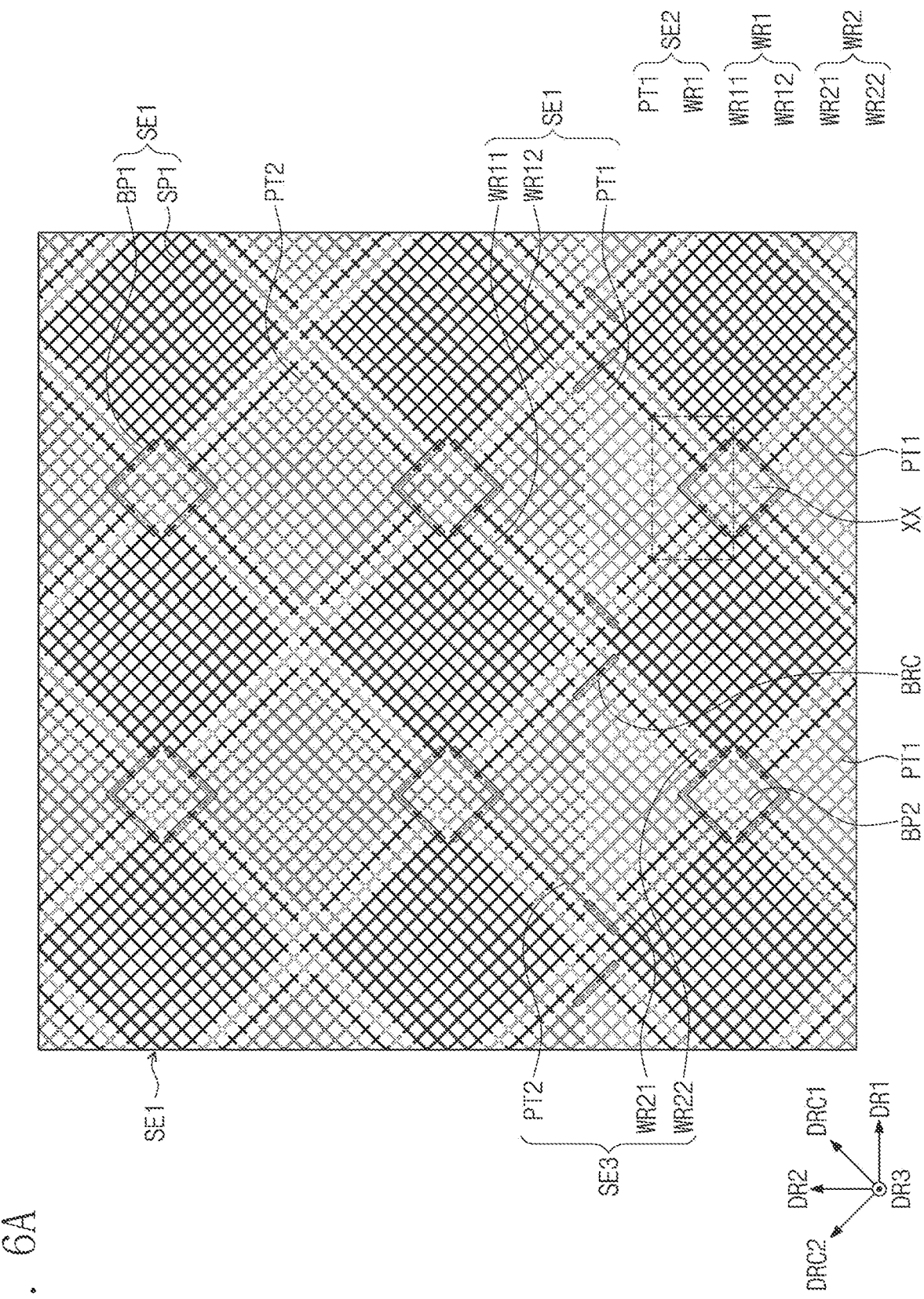
FIG. 6A is an enlarged view showing a portion of an input sensor according to an embodiment of the present disclosure.
Figure 6B:
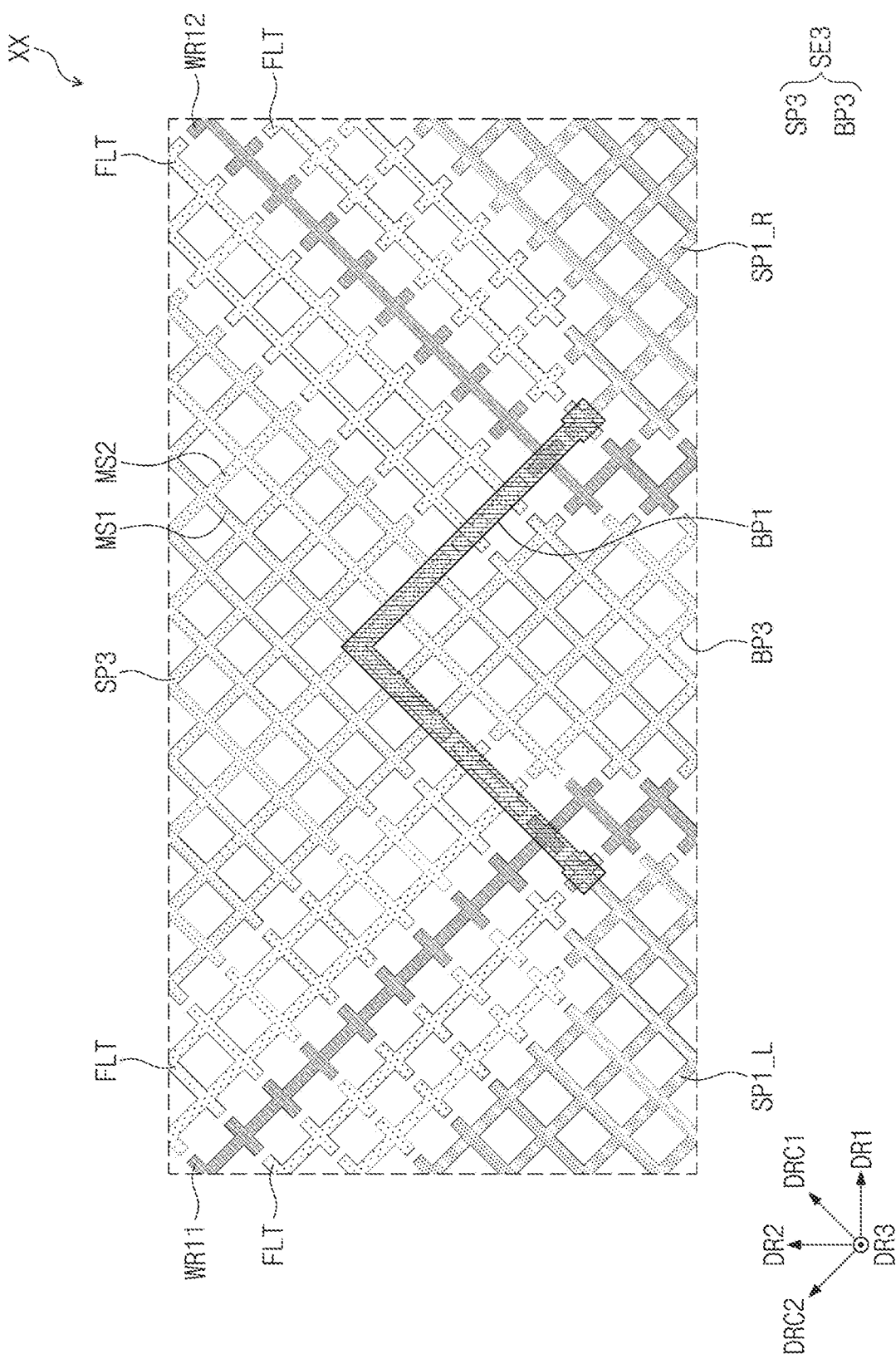
FIG. 6B is an enlarged view showing a partial area in FIG. 6A.

FIG. 6A is an enlarged view showing a portion of an input sensor according to an embodiment of the present disclosure. FIG. 6B is an enlarged view showing a partial area in FIG. 6A. Hereinafter, the present disclosure will be described with reference to FIGS. 6A and 6B. The same reference numeral will be given to the same component as that described in FIGS. 1A to 5, and redundant descriptions will be omitted.

Referring to FIG. 6A, each of the first to third electrodes SE1, SE2, and SE3 may include conductive patterns having a mesh shape. According to an embodiment, each of the first to third sensor portions SE1, SE2, and SE3 may include a first mesh line MS1 extending along a first diagonal direction DRC1 and a second mesh line MS2 intersecting the first mesh line MS1 and extending along a second direction DRC2. In one example, the extension directions of the first and second mesh lines MS1 and MS2 may be variously changed as long as the first and second mesh lines MS1 and MS2 may intersect each other, and the present disclosure may not be limited to any one embodiment.

The first intersecting wire WR1 constituting the second electrode SE2 may include two wire portions WR11 and WR12. That is, the two adjacent first sensor patterns PT1 may be connected to each other via the two wire portions WR11 and WR12. The two wire portions (hereinafter, referred to as first and second wire portions) WR11 and WR12 are spaced apart from each other along the first direction DR1. The first and second wire portions WR11 and WR12 may be spaced apart from each other with the third electrode SE3 and floating patterns FLT interposed therebetween.

Specifically, the first wire portion WR11 may be spaced apart from the second pattern P2 of the third electrode SE3 with the floating pattern FLT interposed therebetween and located on a left side of the third electrode SE3. The second wire portion WR12 may be spaced apart from the third electrode SE3 with the floating pattern FLT interposed therebetween and located on a right side of the third electrode SE3. The floating patterns FLT may be patterns located between the first to third electrodes SE1, SE2, and SE3 and electrically isolated from the first to third electrodes SE1, SE2, and SE3. The input sensor TS may include the floating pattern FLT to prevent or reduce an electrical short-circuit between adjacent electrodes among the first to third electrodes SE1, SE2, and SE3 and to reduce electrical effects between the adjacent electrodes. This is shown as an example. In the input sensor TS according to an embodiment of the present disclosure, the floating pattern FLT may be omitted.

Similarly, the second intersecting wire WR2 constituting the third electrode SE3 may include two wire portions WR21 and WR22. That is, the two adjacent second sensor patterns PT2 may be connected to each other via the two wire portions WR21 and WR22. The two wire portions (hereinafter, referred to as third and fourth wire portions) WR21 and WR22 are spaced apart from each other along the first direction DR1. The third and fourth wire portions WR21 and WR22 may be spaced apart from each other with the third electrode SE3 and the floating patterns FLT interposed therebetween.

FIG. 6B is an enlarged view of an area XX shown in FIG. 6A. Referring to FIG. 6B, the first and second wire portions WR11 and WR12 may be located on the same layer as the first to third sensor portions SP1, SP2 and SP3. Therefore, the coupling capacity between the intersecting wires WR11 and WR12 and the sensor portions SP1, SP2, and SP3 can be minimized and load applied the sensor can be reduced. In this regard, the first connection portion BP1 connects a left sensor portion SP1_L and a right sensor portion SP1_R that are adjacent to each other to each other. The first connection portion BP1 may be located on a different layer from the sensor portions SP1_L, SP1_R, and SP3, the intersecting wires WR11 and WR12, the third connection portion BP3, and the floating pattern FLT.

That is, the first intersecting wire WR1 may be some of the mesh patterns formed on the sensor insulating layer 203 (see FIG. 4). The first and second wire portions WR11 and WR12 may be spaced apart from the second sensor pattern PT2, the first sensor portion SP1, and the floating pattern FLT on a plane. In the present embodiments, the first intersecting wire WR1 is shown as having a curvature or a zigzag shape along the second direction DR2. The first intersecting wire WR1 may have various shapes as long as the first intersecting wire WR1 may connect first sensor patterns PT1 to each other and may be spaced apart from other components on a plane, and the present disclosure may not be limited to any one embodiment.

In the present embodiments, the first and second wire portions WR11 and WR12 and the first sensor pattern PT1 are shown as having an integral shape by being connected to each other. A mesh line (the first mesh line MS1 in the present embodiment) constituting the first wire portion WR11 and the mesh line MS1 constituting the first sensor pattern PT1 may be connected to each other and integrally formed with each other. A mesh line (the first mesh line MS1 in the present embodiment) constituting the second wire portion WR12 and the mesh line MS1 constituting the first sensor pattern PT1 may be connected to each other and integrally formed with each other. However, this is shown as an example. The mesh line constituting the second wire portion WR12 and the mesh line constituting the first sensor pattern PT1 may be located on the sensor insulating layer 203 and be stacked with each other, and the present disclosure may not be limited to any one embodiment.

The second intersecting wire WR2 may also be located on the same layer as the first intersecting wire WR1. That is, the third and fourth wire portions WR21 and WR22 may be located on the same layer as the first sensor pattern PT1, the first sensor portion SP1, and the floating pattern FLT like the first and second wire portions WR11 and WR12 shown in FIG. 6B, but may have a curvature or a zigzag shape so as to be spaced apart from those on a plane, and the present disclosure may not be limited to any one embodiment.

When all of the first to fourth wire portion WR11, WR12, WR21, and WR22 are located, one of the first wire portion WR11 and the third wire portion WR21 may further include a bridge. Similarly, one of the second wire portion WR12 and the fourth wire portion WR22 may further include a bridge BRC.

When taking the first wire portion WR11 and the third wire portion WR21 as an example, the bridge BRC may be located in an area where the first wire portion WR11 and the third wire portion WR21 intersect each other on a plane. According to an embodiment, the first wire portion WR11 may be integrally formed with the first sensor pattern PT1 and the third wire portion WR21 may be connected to the second sensor pattern PT2 via the bridge BRC. That is, the third wire portion WR21 may include sub-portions SBL disconnected from each other and the bridge BRC connecting the sub-portions SBL to each other in the area intersecting the first wire portion WR11. The bridge BRC may be located on a layer different that of the sub-portions SBL. Accordingly, even when the first wire portion WR11 and the third wire portion WR21 are located on the same layer and intersect each other, they may be distinguished from each other without an electrical short circuit and stably connected to each other. However, this is shown as an example. The bridge BRC may be connected to the first wire portion WR11. Alternatively, the bridge BRC may be omitted and the first wire portion WR11 may be located on a layer different from that of the third wire portion WR21. According to the present disclosure, as long as the first wire portion WR11 and the third wire portion WR21 are not electrically short-circuited to each other, they may have various structures, and the present disclosure may not be limited to any one embodiment.

Figure 7A:
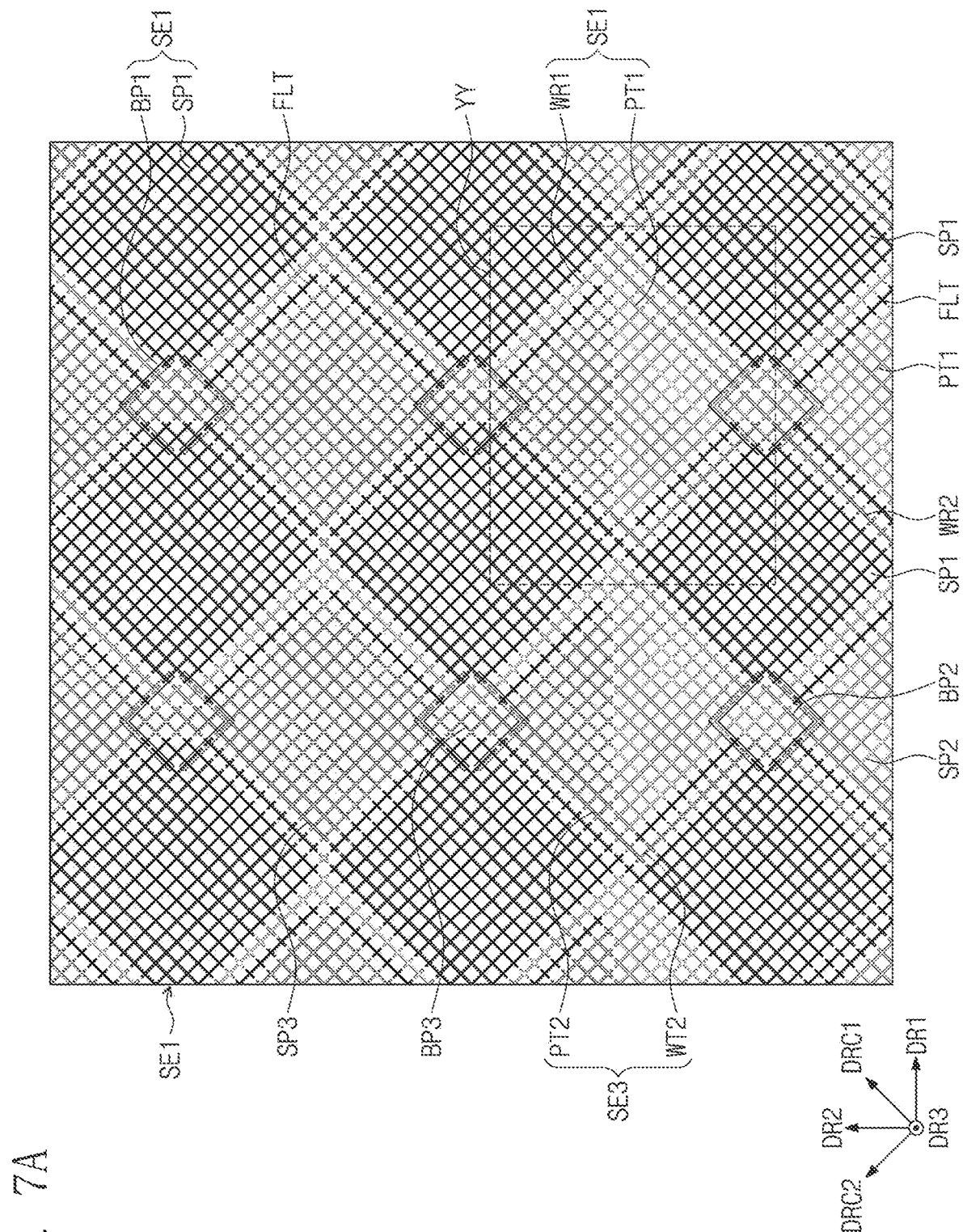
FIG. 7A is a plan view showing a portion of an input sensor according to an embodiment of the present disclosure.

FIG. 7A is a plan view showing a portion of an input sensor according to an embodiment of the present disclosure. FIG. 7B is an enlarged view showing a partial area of FIG. 7A. For easy description, FIG. 7A shows an area corresponding to that in FIG. 6A, and FIG. 7B is an enlarged view of an area YY in FIG. 7A. Hereinafter, the present disclosure will be described with reference to FIGS. 7A and 7B. The same reference numeral will be assigned to the same component as that described in FIGS. 1A to 6B, and redundant descriptions will be omitted.

Referring to FIG. 7A, in the input sensor TS according to an embodiment of the present disclosure, connection of adjacent patterns may be performed via a single intersecting wire. For example, connection of the first sensor patterns PT1 may be made via one first intersecting wire WR1. The first intersecting wire WR1 connects the two first sensor patterns PT1 to each other via a space between the first electrodes SE1 and one side of the second sensor pattern PT2.

Connection of the second sensor patterns PT2 may be made via one second intersecting wire WR2. The second intersecting wire WR2 connects the two second sensor patterns PT2 to each other via a space between the first electrodes SE1 and one side of the first sensor pattern PT1.

The first intersecting wire WR1 and the second intersecting wire WR2 may be located at locations so as to be alternately arranged. For example, the first intersecting wire WR1 may be located on a right side of second sensor pattern PT2, and the second intersecting wire WR2 may be located on a left side of the first sensor pattern PT1. As the first intersecting wire WR1 and the second intersecting wire WR2 are alternately arranged, an electrical short circuit between the first intersecting wire WR1 and the second intersecting wire WR2 may be prevented or reduced.

Specifically, referring to FIG. 7B, the first intersecting wire WR1 may have an integral shape connected to the corresponding first sensor pattern PT1. That is, at least one of the mesh lines constituting the first intersecting wire WR1 and at least one of the mesh lines constituting the first sensor pattern PT1 may be connected to each other to form an integral mesh line.

The second intersecting wire WR2 may have an integral shape connected to the corresponding second sensor pattern PT2. That is, at least one of the mesh lines constituting the second intersecting wire WR2 and at least one of the mesh lines constituting the second sensor pattern PT2 may be connected to each other to form an integral mesh line.

According to the present disclosure, the first intersecting wire WR1 and the second intersecting wire WR2 are arranged at the locations so as to be alternately arranged, so that the first intersecting wire WR1 and the second intersecting wire WR2 may not intersect each other on a plane. Accordingly, the first intersecting wire WR1 and the second intersecting wire WR2 may be stably connected to the first sensor pattern PT1 and the second sensor pattern PT2, respectively, without the separate bridge.

Figure 8:
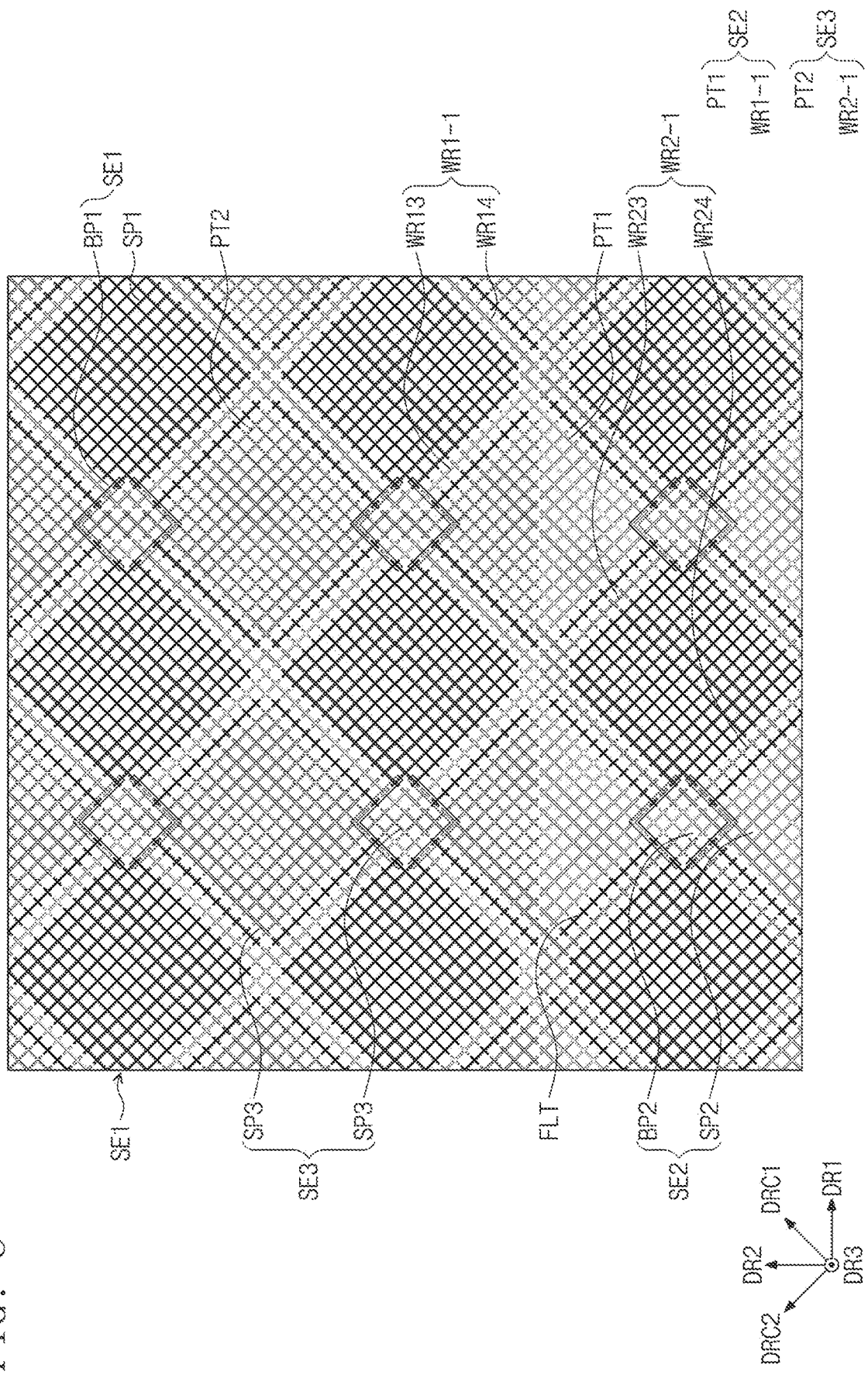
FIG. 8 is a plan view showing a portion of an input sensor according to an embodiment of the present disclosure.

FIG. 8 is a plan view showing a portion of an input sensor according to an embodiment of the present disclosure. For easy description, FIG. 8 shows an area corresponding to that in FIG. 6A. Hereinafter, the present disclosure will be described with reference to FIG. 8. The same reference numeral will be given to the same component as that described in FIGS. 1A to 7B, and redundant descriptions will be omitted.

Referring to FIG. 8, in the input sensor TS according to an embodiment of the present disclosure, a first intersecting wire WR1-1 may have a closed line shape. The first intersecting wire WR1-1 may include a first wire portion WR13 passing through a space between the connected first sensor pattern PT1 and the first sensor portion SP1, and a second wire portion WR14 passing through a space between another first sensor pattern PT1 spaced apart therefrom in the first direction DR1 and the first sensor portion SP1.

The first wire portion WR13 and the second wire portion WR14 may be directly connected to each other. The first wire portion WR13 and the second wire portion WR14 may be connected to each other to have a closed line shape. The closed line shape may be a shape surrounding edges of the first sensor portion SP1 on a plane.

That is, the first intersecting wire WR1-1 may include the two wire portions WR13 and WR14 forming two paths spaced apart from each other in the first direction DR1 with the first sensor portion SP1 interposed therebetween. Accordingly, the first intersecting wire WR1-1 may have a lower resistance than the intersecting wire WR1 shown in FIG. 7A.

Similarly, a second intersecting wire WR2-1 may have a closed line shape. The second intersecting wire WR2-1 may include a third wire portion WR23 passing through a space between the connected second sensor pattern PT2 and the first sensor portion SP1, and a fourth wire portion WR24 passing through a space between another second sensor pattern PT2 spaced apart therefrom in the first direction DR1 and the first sensor portion SP1.

The third wire portion WR23 and the fourth wire portion WR24 may be directly connected to each other. The third wire portion WR23 and the fourth wire portion WR24 may be connected to each other to have a closed line shape. The closed line shape may be a shape surrounding edges of the first sensor portion SP1 on a plane.

That is, the second intersecting wire WR2-1 may include the two wire portions WR23 and WR24 forming two paths spaced apart from each other in the first direction DR1 with the first sensor portion SP1 interposed therebetween. Accordingly, the second intersecting wire WR2-1 may have a lower resistance than the intersecting wire WR2 shown in FIG. 7A. According to the present disclosure, the intersecting wires WR1-1 and WR2-1 may have various shapes and the present disclosure may not be limited to any one embodiment.

Figure 9A:
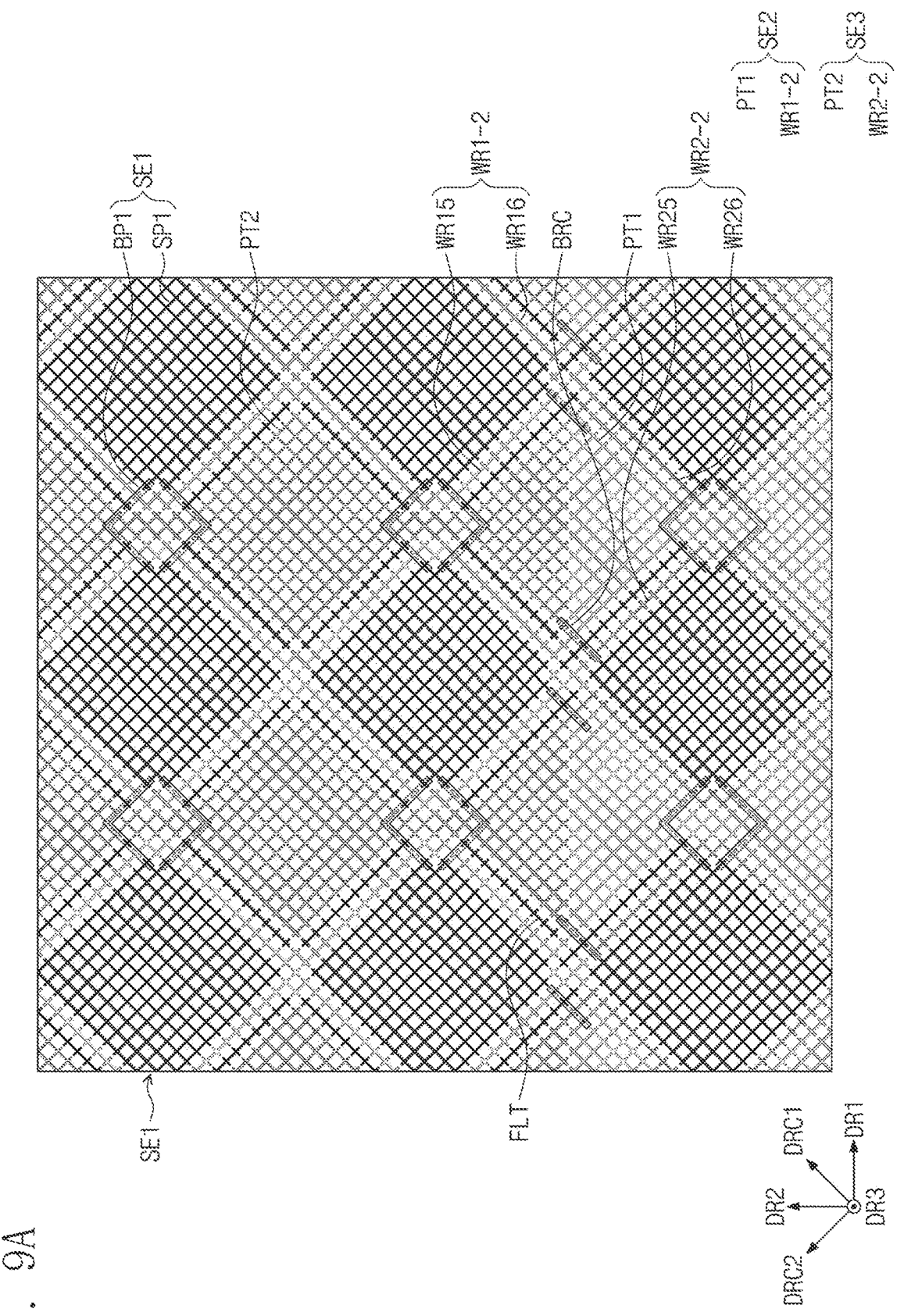
FIG. 9A is a plan view showing a portion of an input sensor according to an embodiment of the present disclosure.
Figure 9B:
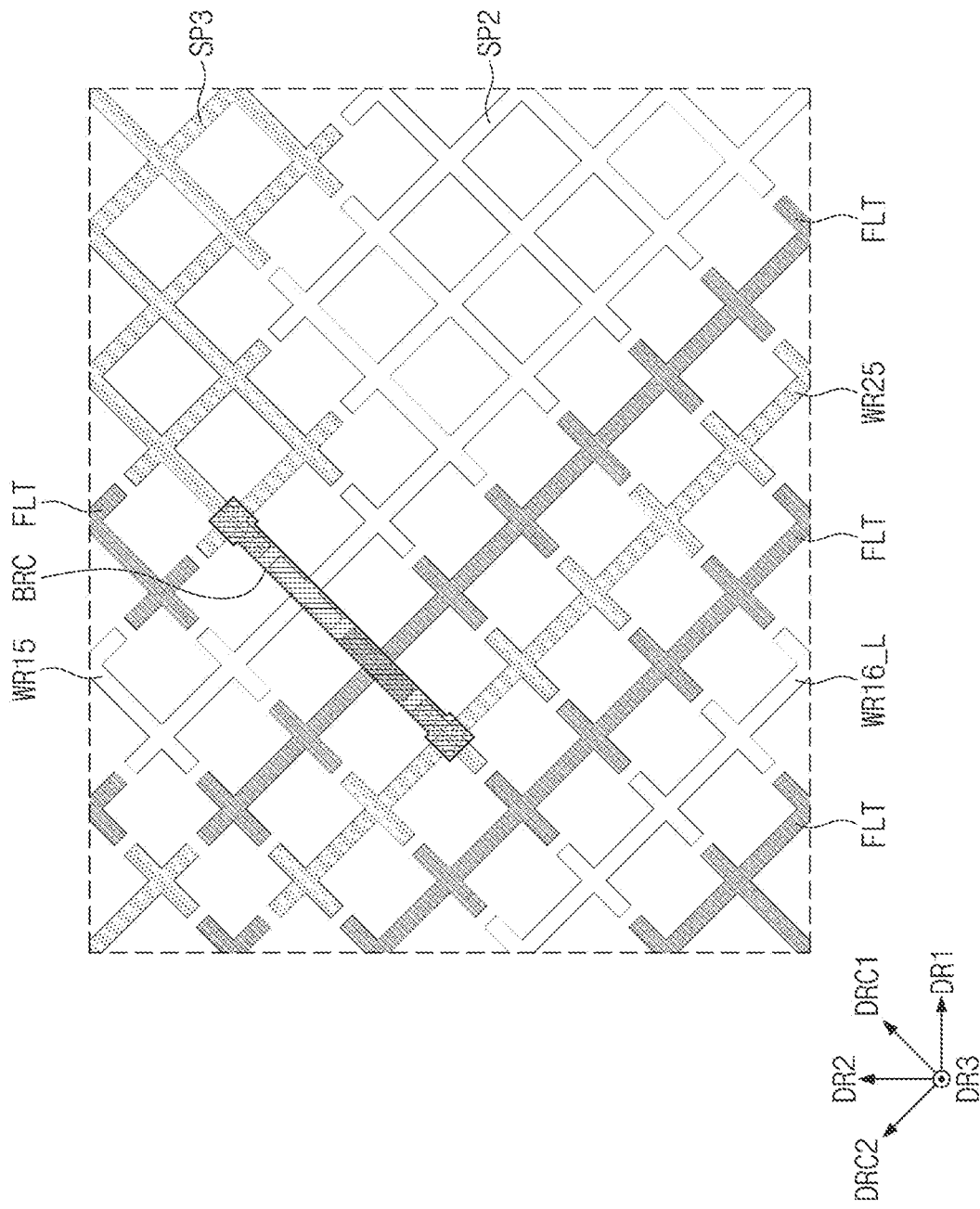
FIG. 9B is an enlarged view showing a partial area in FIG. 9A according to an embodiment of the present disclosure.

FIG. 9A is a plan view showing a portion of an input sensor according to an embodiment of the present disclosure. FIG. 9B is an enlarged view showing a partial area in FIG. 9A. For easy description, FIG. 9A shows an area corresponding to that in FIG. 6A, and FIG. 9B is an enlarged view of an area ZZ shown in FIG. 9A. Hereinafter, the present disclosure will be described with reference to FIGS. 9A and 9B. The same reference numeral will be given to the same component as that described in FIGS. 1A to 8, and redundant descriptions will be omitted.

Referring to FIGS. 9A and 9B, in the input sensor, a first intersecting wire WR1-2 and a second intersecting wire WR2-2 may be connected to the respective corresponding sensor patterns via the bridge BRC. Specifically, the first intersecting wire WR1-2 may include a first wire portion WR15 and a second wire portion WR16 arranged along the first direction DR1. The first wire portion WR15 may be connected to one side of the first sensor pattern PT1 and the second wire portion WR16 may be connected to the other side of the first sensor pattern PT1. In the present embodiments, one side corresponds to a left side and the other side corresponds to a right side, but the present disclosure is not limited thereto.

In this regard, the first wire portion WR15 may be directly connected to one side of the first sensor pattern PT1 to have an integral shape with the first sensor pattern PT1. On the other hand, the second wire portion WR16 may be connected to the other side of the first sensor pattern PT1 via a bridge BRC. Accordingly, the second wire portion WR16 is spaced apart from the other side of the first sensor pattern PT1 on a plane.

The second intersecting wire WR2-2 may include a third wire portion WR25 and a fourth wire portion WR26 arranged along the first direction DR1. The third wire portion WR25 may be connected to one side of the second sensor pattern PT2 and the fourth wire portion WR26 may be connected to the other side of the second sensor pattern PT2. In the present embodiments, one side corresponds to a left side and the other side corresponds to a right side, but the present disclosure is not limited thereto.

In this regard, the third wire portion WR25 may be connected to one side of the second sensor pattern PT2 via the bridge BRC. Accordingly, the third wire portion WR25 is spaced apart from one side of the second sensor pattern PT2 on a plane. On the other hand, the fourth wire portion WR26 may be directly connected to the other side of the second sensor pattern PT2 and have an integral shape with the second sensor pattern PT2.

An area where the bridges BRC are located may be an area where the first wire portion WR15 and the third wire portion WR25 intersect each other and an area where the second wire portion WR16 and the fourth wire portion WR26 intersect each other. According to the present disclosure, the input sensor may provide the connection by the bridges BRC to the first intersecting wire WR1-2 and the second intersecting wire WR2-2, respectively, thereby evenly distributing resistances for the second electrode SE2 and the third electrode SE3. Accordingly, even when the intersecting wire is added, occurrence of a signal error or the like resulted from non-uniform design may be prevented or reduced, and thus, an input sensor with even sensitivity may be provided.

In addition, according to the present disclosure, the input sensor may further include the bridges BRC to prevent or reduce an electrical short circuit of the intersecting wires WR1-2 and WR2-2 located on the same layer. In addition, because a design with the intersecting wires on a plane is possible, a density of the wires may be reduced and a degree of freedom in design may be relatively improved.

Figure 10A:
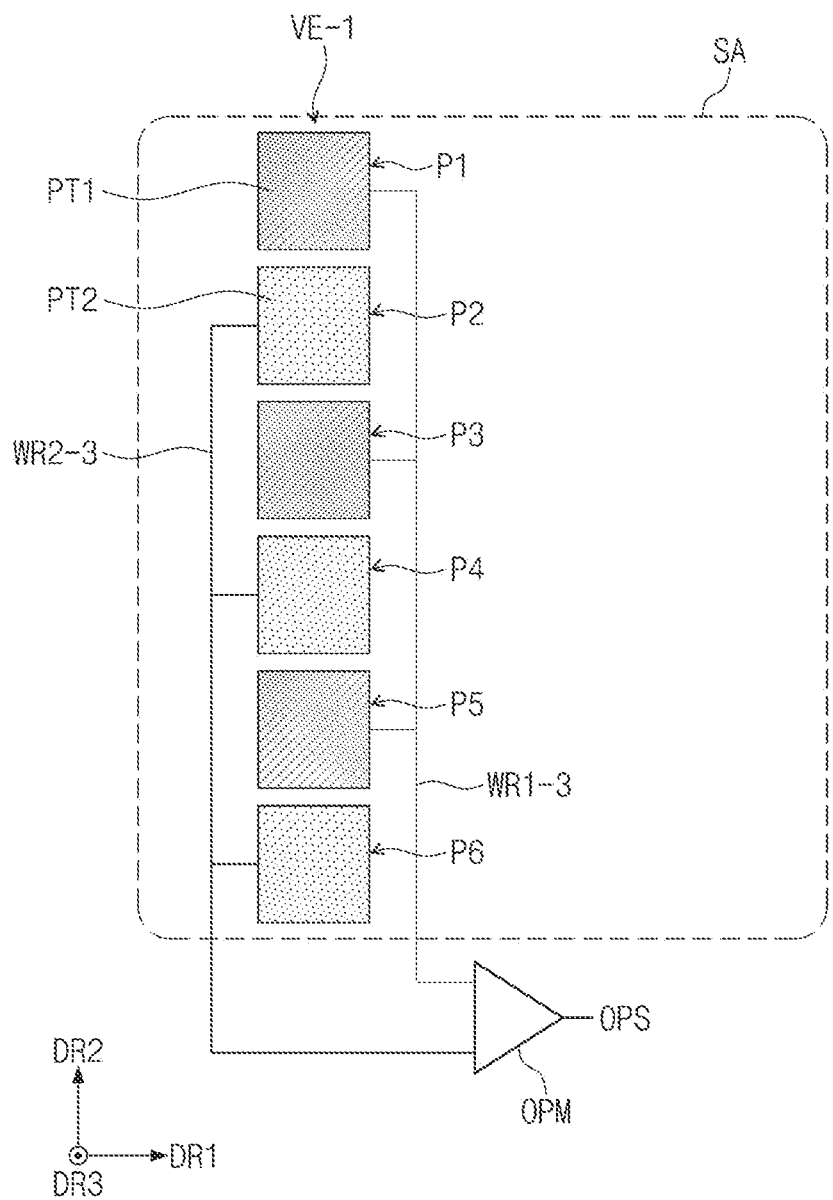
FIGS. 10A to 10B are plan views showing a portion of an input sensor according to an embodiment of the present disclosure.
Figure 10B:
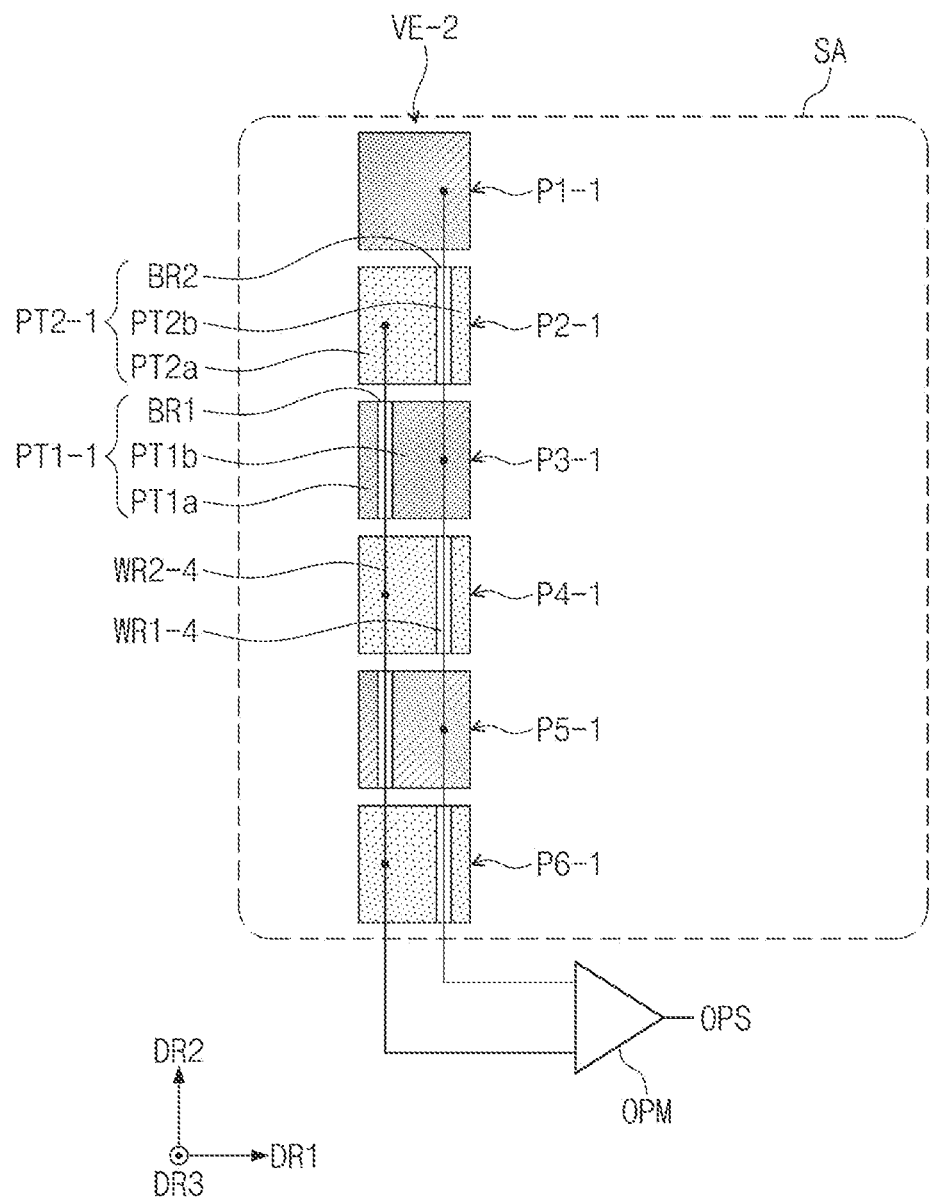

FIGS. 10A to 10B are plan views showing a portion of an input sensor according to an embodiment of the present disclosure. FIGS. 10A to 10B show an area corresponding to FIG. 5 for easy description. Hereinafter, the present disclosure will be described with reference to FIGS. 10A to 10B and a redundant description will be omitted.

Referring to FIG. 10A, a column electrode VE-1 may include a single first intersecting wire WR1-3 and a single second intersecting wire WR2-3. That is, in the one column electrode VE-1, each of the first intersecting wire WR1-3 and the second intersecting wire WR2-3 may be provided as a single line. Specifically, the first intersecting wire WR1-3 may be provided as the single line located on a right side of the first to sixth patterns P1 to P6. In the present embodiments, for ease of description, the first intersecting wire WR1-3 is shown as a straight line extending along the second direction DR2, but the first intersecting wire WR1-3 may not be limited thereto, have a curved line shape along a right border of the first to sixth patterns P1 to P6, and not be limited to any one embodiment.

The first intersecting wire WR1-3 extends along the second direction DR2 and is connected to each of the adjacent odd-numbered patterns P1, P3, and P5. Each of the odd-numbered patterns P1, P3, and P5 may correspond to the first sensor pattern PT1. The first intersecting wire WR1-3 may further include portions that respectively branch toward the patterns P1, P3, and P5 for electrical connection.

The first intersecting wire WR1-3 may be the single line located on the right side of the first to sixth patterns P1 to P6. In the present embodiments, for ease of description, the first intersecting wire WR1-3 is shown as the straight line extending along the second direction DR2, but the first intersecting wire WR1-3 may not be limited thereto, have the curved line shape along the right border of the first to sixth patterns P1 to P6, and not be limited to any one embodiment.

The second intersecting wire WR2-3 may be the single line located on a left side of the first to sixth patterns P1 to P6. In the present embodiments, for ease of description, the second intersecting wire WR2-3 is shown as the straight line extending along the second direction DR2, but the second intersecting wire WR2-3 may not be limited thereto, have a curved line shape along a left border of the first to sixth patterns P1 to P6, and not be limited to any one embodiment.

The second intersecting wire WR2-3 extends along the second direction DR2 and is connected to each of the adjacent even-numbered patterns P2, P4, and P6. Each of the even-numbered patterns P2, P4, and P6 may correspond to the second sensor pattern PT2. The second intersecting wire WR2-3 may further include portions that respectively branch toward the patterns P2, P4, and P6 for electrical connection.

The second intersecting wire WR2-3 may be the single line located on the left side of the first to sixth patterns P1 to P6. In the present embodiments, for ease of description, the second intersecting wire WR2-3 is shown as the straight line extending along the second direction DR2, but the second intersecting wire WR2-3 may not be limited thereto, have the curved line shape along the left border of the first to sixth patterns P1 to P6, and not be limited to any one embodiment.

In one example, the first intersecting wire WR1-3 may correspond to the plurality of first intersecting wires WR1 (see FIG. 5) shown in FIG. 5 connected to each other outside the patterns P1 to P6. Likewise, the second intersecting wire WR2-3 may correspond to the plurality of second intersecting wires WR2 (see FIG. 5) shown in FIG. 5 connected to each other outside the patterns P1 to P6.

Alternatively, referring to FIG. 10B, in a column electrode VE-2, a first intersecting wire WR1-4 and a second intersecting wire WR2-4 may cross first to sixth patterns P1-1 to P6-1. For example, the second intersecting wire WR2-4 may extend along the second direction DR2 and pass through the odd-numbered patterns P1-1, P3-1, and P5-1, respectively. Each of the odd-numbered patterns P1-1, P3-1, and P5-1 may correspond to a first sensor pattern PT1-1. The first sensor pattern PT1-1 may include a plurality of sub-patterns PT1a and PT1b divided from each other by the second intersecting wire WR2-4, and a bridge pattern (hereinafter, referred to as a first bridge pattern) BR1 that connects the sub-patterns PT1a and PT1b to each other.

The sub-patterns PT1a and PT1b may be spaced apart from each other in the first direction DR1 with the second intersecting wire WR2-4 interposed therebetween. The sub-patterns PT1a and PT1b may include the left first sub-pattern PT1a located on a left side and the right first sub-pattern PT1b located on a right side of the second intersecting wire WR2-4. The second intersecting wire WR2-4 may be spaced apart from the first sub-patterns PT1a and PT1b on a plane.

The first bridge pattern BR1 extends along the second direction DR2 and connects the two first sub-patterns PT1a and PT1b that are spaced apart from each other to each other. The first bridge pattern BR1 may be located on a different layer from the second intersecting wire WR2-4.

The first intersecting wire WR1-4 may extend along the second direction DR2 and pass through the even-numbered patterns P2-1, P4-1, and P6-1. Each of the even-numbered patterns P2-1, P4-1, and P6-1 may correspond to a second sensor pattern PT2-1. The second sensor pattern PT2-1 may include a plurality of sub-patterns PT2a and PT2b divided from each other by the first intersecting wire WR1-4, and a bridge pattern (hereinafter, referred to as a second bridge pattern) BR2 that connects the sub-patterns PT2a and PT2b to each other.

The sub-patterns PT2a and PT2b may be spaced apart from each other in the first direction DR1 with the first intersecting wire WR1-4 interposed therebetween. The sub-patterns PT2a and PT2b may include the left second sub-pattern PT2a located on a left side and the right second sub-pattern PT2b located on a right side of the first intersecting wire WR1-4. The first intersecting wire WR1-4 may be spaced apart from the second sub-patterns PT2a and PT2b on a plane.

The second bridge pattern BR2 extends along the second direction DR2 and connects the two second sub-patterns PT2a and PT2b that are spaced apart from each other with each other. The second bridge pattern BR2 may be located on a different layer from the first intersecting wire WR1-4.

According to the present disclosure, the first intersecting wire WR1-4 and the second intersecting wire WR2-4 may be arranged within the first to sixth patterns P1-1 to P6-1 and portions thereof may overlap the first to sixth patterns P1-1 to P6-1 on a plane. That is, according to the present disclosure, as long as the intersecting wires are not connected to different wires, the intersecting wires may be located outside or across the patterns and may not be limited to any one embodiment.

Figure 11:
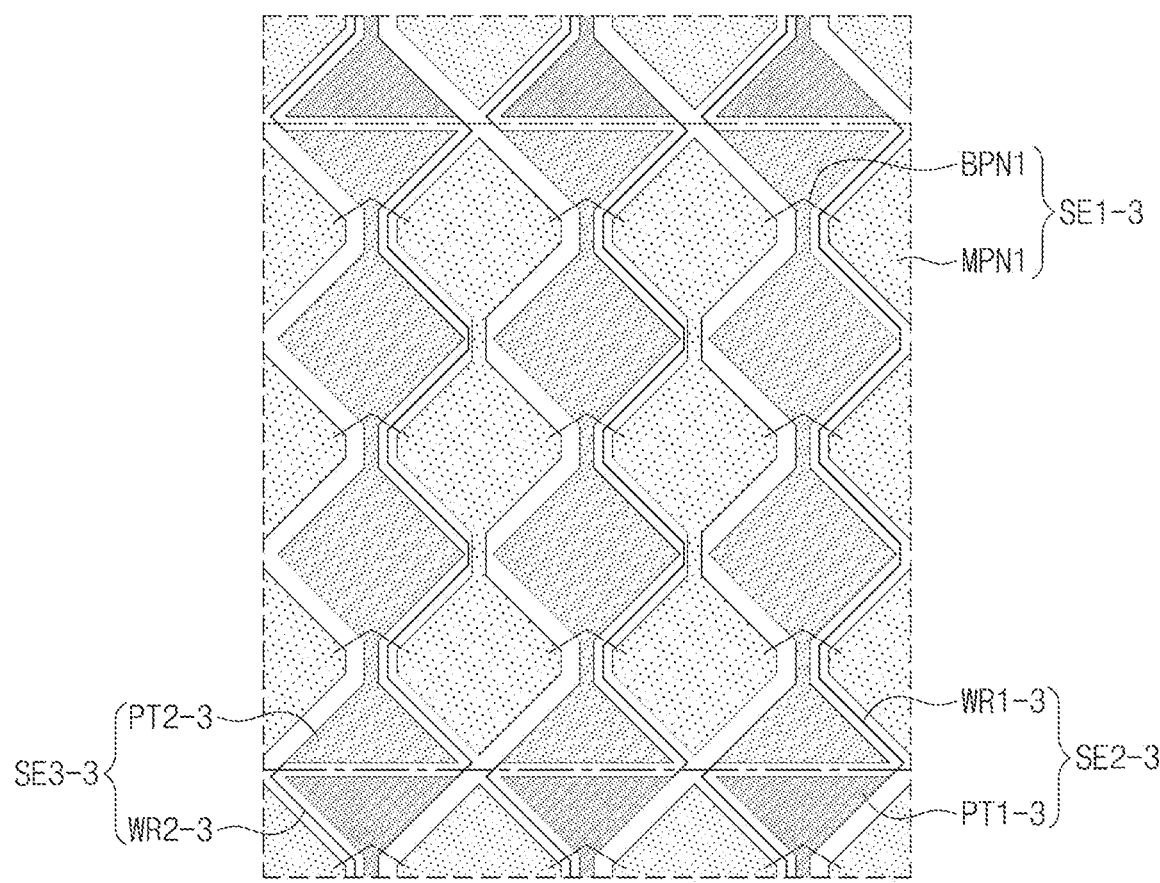
FIG. 11 is an enlarged plan view of a portion of FIG. 10B.

FIG. 11 is an enlarged plan view of a portion of FIG. 10B. Hereinafter, the present disclosure will be described with reference to FIG. 11. The same reference numerals will be assigned to the same components as those described in FIGS. 1 to 10B, and a redundant description will be omitted.

As shown in FIG. 11, a first electrode SE1-1 may include a plurality of main portions MPN1 spaced apart from each other along the first direction, and connection portions BPN1 that connect the main portions MPN1 with each other. The main portions MPN1 may be located between three second sensor patterns PT2-3 spaced apart from each other along the first direction DR1. According to an embodiment, the three second sensor patterns PT2-3 may constitute the single third sensor portion SP3 (see FIG. 3B). Additionally, the plurality of main portions MPN1 and the connection parts BPN1 arranged therebetween may constitute the single first sensor portion SP1 (see FIG. 3B). In other words, an area where the three second sensor patterns PT2-3 and the first electrode SE1-1 are located may define a unit sensing node area.

In this regard, the unit sensing node area may be provided with the first electrode SE1-1 that transmits the first signal, a second electrode SE2-3 that transmits the second signal, and a third electrode SE3-3 that transmits the third signal. In the unit sensing node area, the second electrode SE2-3 may be provided to first sensor patterns PT1-3, and the third electrode SE3-3 may be provided to second sensor patterns PT2-3. Accordingly, capacitance by the three electrodes may be generated in the unit sensing node area.

Although the description has been made with reference to an embodiment of the present disclosure, those skilled in the art or those having common knowledge in the art will understand that the present disclosure may be variously modified and changed within a range that does not deviate from the technical area and the spirit of the present disclosure described in the claims to be described later. Therefore, the technical scope of the present disclosure is not limited to the contents described in the detailed description herein, but should be determined by the claims, and their equivalents.

According to the present disclosure, the decrease in the sensitivity caused by the noise in the sensor area may be prevented or reduced. Accordingly, the input sensor having relatively improved touch sensitivity and the electronic device including the same may be provided.

While the present disclosure has been described with reference to embodiments thereof, it will be apparent to those of ordinary skill in the art that various changes and modifications may be made thereto without departing from the spirit and scope of the present disclosure as set forth in the following claims, and their equivalents.

What is claimed is:

1. An input sensor comprising:
   a first electrode extending along a first direction and configured to transmit a first signal;
   a second electrode configured to transmit a second signal different from the first signal, and including a plurality of first sensor patterns arranged along a second direction intersecting the first direction and a first intersecting wire and connecting the first sensor patterns to each other;
   a third electrode configured to transmit a third signal different from the first signal, and including a plurality of second sensor patterns alternately arranged with the first sensor patterns along the second direction and a second intersecting wire and connecting the second sensor patterns to each other; and
   a sensor driving circuit including an output part configured to output a signal obtained by subtracting the third signal from the second signal,
   wherein the first intersecting wire and the second intersecting wire are on a same layer as the first sensor patterns and the second sensor patterns,
   wherein the second electrode further includes a bridge on a different layer from the first sensor patterns,
   wherein the first intersecting wire is connected to the first sensor patterns via the bridge.

2. The input sensor of claim 1, wherein each of the first sensor patterns and the second sensor patterns include a plurality of mesh lines intersecting each other.

3. The input sensor of claim 1, wherein the first intersecting wire has an integral shape with the first sensor patterns.

4. The input sensor of claim 3, wherein the second intersecting wire has an integral shape with the first sensor patterns.

5. The input sensor of claim 3, wherein the third electrode further includes a bridge on a different layer from the second sensor patterns,
   wherein the second intersecting wire is connected to the second sensor patterns via the bridge.

6. The input sensor of claim 1, wherein the bridge overlaps one of the second sensor patterns in a plan view.

7. The input sensor of claim 1, wherein the first electrode includes:
   a plurality of first sensor portions arranged along the first direction; and
   a plurality of first connection portions, wherein each first connection portion is between each adjacent two of the first sensor portions and connecting the two to each other,
   wherein the first connection portions are on a same layer as the bridge.

8. The input sensor of claim 1, wherein the first intersecting wire and the second intersecting wire are spaced apart from the first electrode in the first direction.

9. The input sensor of claim 8, wherein the first intersecting wire is spaced apart from the second sensor patterns in the first direction.

10. The input sensor of claim 8, wherein the second intersecting wire is spaced apart from the first electrode in the first direction.

11. The input sensor of claim 8, wherein the first intersecting wire and the second intersecting wire do not overlap each other when viewed in the first direction.

12. The input sensor of claim 1, wherein the first intersecting wire includes a first sub-wire and a second sub-wire spaced apart from each other in the first direction with the second sensor patterns interposed between,
   wherein each of the first sub-wire and the second sub-wire is between the second sensor patterns and the first electrode.

13. The input sensor of claim 12, wherein the second intersecting wire includes a third sub-wire and a fourth sub-wire spaced apart from each other in the first direction with the first sensor patterns interposed between,
wherein the third sub-wire intersects the first sub-wire on a plane, and the fourth sub-wire intersects the second sub-wire on the plane.

14. The input sensor of claim 13, further comprising:
a plurality of bridges on a different layer from the first intersecting wire and the second intersecting wire,
wherein the bridges are connected to the first sub-wire and the second sub-wire, respectively, or connected to the third sub-wire and the fourth sub-wire, respectively.

15. The input sensor of claim 1, further comprising:
a floating pattern electrically insulated from the first to third electrodes,
wherein the floating pattern is on a same layer as the first sensor patterns and the second sensor patterns.

16. The input sensor of claim 15, wherein the floating pattern is between the first intersecting wire and the second sensor patterns or between the second intersecting wire and the first sensor patterns.

17. An electronic device comprising:
a plurality of pixels;
an encapsulation layer on the pixels; and
an input sensor on the encapsulation layer,
wherein the input sensor includes:
a first electrode extending along a first direction and configured to transmit a first signal;
a second electrode configured to transmit a second signal different from the first signal, and including a plurality of first sensor patterns arranged along a second direction intersecting the first direction and a first intersecting wire and connecting the first sensor patterns to each other;
a third electrode configured to transmit a third signal different from the first signal, and including a plurality of second sensor patterns alternately arranged with the first sensor patterns along the second direction and a second intersecting wire and connecting the second sensor patterns to each other; and
a sensor driving circuit including an output part configured to output a signal obtained by subtracting the third signal from the second signal,
wherein the first intersecting wire and the second intersecting wire are on a same layer as the first sensor patterns and the second sensor patterns,
wherein the first intersecting wire includes a first wire and a second wire spaced apart from each other with the second sensor patterns between in the first direction,
wherein the second electrode further includes a bridge on a different layer from the first wire,
wherein the bridge connects the first wire and the first sensor patterns to each other.

18. The electronic device of claim 17, wherein the first intersecting wire is on one side of the second sensor patterns,
wherein the second intersecting wire is on the other side of the first sensor patterns.

19. The electronic device of claim 17, wherein the first wire and the second wire have an integral shape with the first sensor patterns.

20. The electronic device of claim 17, wherein the second intersecting wire overlaps the bridge on a plane.

21. The electronic device of claim 18, wherein the first sensor pattern forms a single sensor portion.

22. The electronic device of claim 18, wherein the first sensor pattern includes a plurality of first sensor patterns arranged along the first direction,
wherein the plurality of first sensor patterns are connected to each other to form a single sensor portion.

23. The electronic device of claim 22, wherein the first electrode includes the single sensor portion including a plurality of patterns between the first sensor patterns and connected to each other.

24. The electronic device of claim 18, wherein the input sensor is configured to generate a difference value between the signal transmitted via the second electrode and the signal transmitted via the third electrode.

* * * * *